(12) United States Patent
Okada et al.

(10) Patent No.: US 7,881,543 B2
(45) Date of Patent: Feb. 1, 2011

(54) IMAGE COMPRESSION PROCESSING DEVICE, IMAGE COMPRESSION PROCESSING METHOD, AND IMAGE COMPRESSION PROCESSING PROGRAM

(75) Inventors: Miyuki Okada, Kanagawa (JP); Isao Kawanishi, Kanagawa (JP); Mikiko Hama, Tokyo (JP); Takeshi Harano, Tokyo (JP)

(73) Assignee: Sony Corporation, Tokyo (JP)

( * ) Notice: Subject to any disclaimer, the term of this patent is extended or adjusted under 35 U.S.C. 154(b) by 1041 days.

(21) Appl. No.: 11/597,333

(22) PCT Filed: Jun. 22, 2005

(86) PCT No.: PCT/JP2005/011878

§ 371 (c)(1),
(2), (4) Date: Nov. 22, 2006

(87) PCT Pub. No.: WO2005/125216

PCT Pub. Date: Dec. 29, 2005

(65) Prior Publication Data

US 2007/0110328 A1    May 17, 2007

(30) Foreign Application Priority Data

Jun. 22, 2004  (JP)  .................. P2004-183226

(51) Int. Cl.
G06K 9/36  (2006.01)
G06K 9/00  (2006.01)
G06K 9/40  (2006.01)
H04N 1/00  (2006.01)
H04N 7/12  (2006.01)
H04N 11/02  (2006.01)

(52) U.S. Cl. ................. 382/232; 382/239; 382/251; 382/263; 382/264; 358/426.02; 348/404.1

(58) Field of Classification Search .................. 382/232
See application file for complete search history.

(56) References Cited

U.S. PATENT DOCUMENTS 5,051,840 A * 9/1991 Watanabe et al. ........... 382/239

(Continued)

FOREIGN PATENT DOCUMENTS

EP    0 687 111 A2    12/1995

(Continued)

OTHER PUBLICATIONS

English translation of the international preliminary report on patentability for Int'l. application No. PCT/JP2005/011878 dated Jan. 11, 2007.

(Continued)

*Primary Examiner*—Bhavesh M Mehta
*Assistant Examiner*—Jose M Torres
(74) *Attorney, Agent, or Firm*—Rader, Fishman & Grauer PLLC

(57) ABSTRACT

A high-frequency integrating circuit 32 detects characteristics of horizontal high-frequency components and vertical high-frequency components of the image formed by a processing-target image signal. Based on the detection result, a CPU 61 obtains the number of bits of the after-compression-coding data of the image signal, and calculates the compression rate dependent upon the number of bits. The CPU 61 controls an image codec 36 so that the processing-target image signal is compression-coded through only one time of compression coding processing by use of the calculated compression rate. This configuration allows the image compression processing (compression coding) to be rapidly executed with high accuracy.

22 Claims, 10 Drawing Sheets

U.S. PATENT DOCUMENTS

| | | | |
|---|---|---|---|
| 5,283,656 A | | 2/1994 | Sugahara |
| 5,959,675 A | * | 9/1999 | Mita et al. ............. 375/240.04 |
| 2003/0035589 A1 | * | 2/2003 | Kim .......................... 382/239 |
| 2004/0062316 A1 | * | 4/2004 | Xiong et al. ........... 375/240.29 |

FOREIGN PATENT DOCUMENTS

| | | |
|---|---|---|
| JP | 02-111176 | 4/1990 |
| JP | 03-121036 | 5/1991 |
| JP | 04-145767 | 5/1992 |
| JP | 07-203428 | 8/1995 |
| JP | 07-312751 | 11/1995 |
| JP | 10-164579 | 6/1998 |
| JP | 2003-199019 | 7/2003 |

OTHER PUBLICATIONS

Japanese Office Action issued Apr. 30, 2009 for corresponding Japanese Application No. 2004-183226.
International Search Report (PCT/ISA/210) (4 pages).
International Search Report (PCT/ISA/237) (3 pages).

* cited by examiner

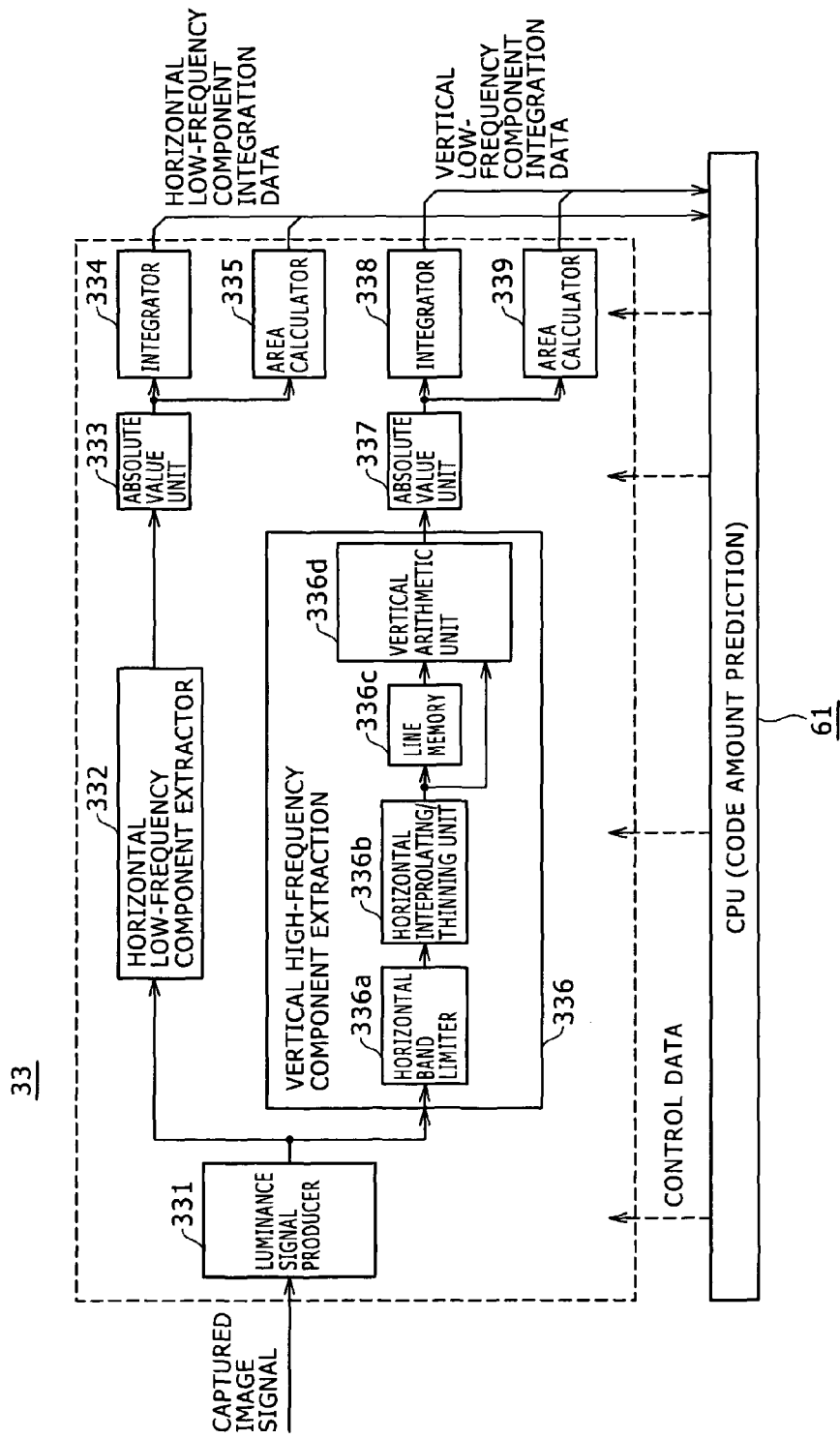

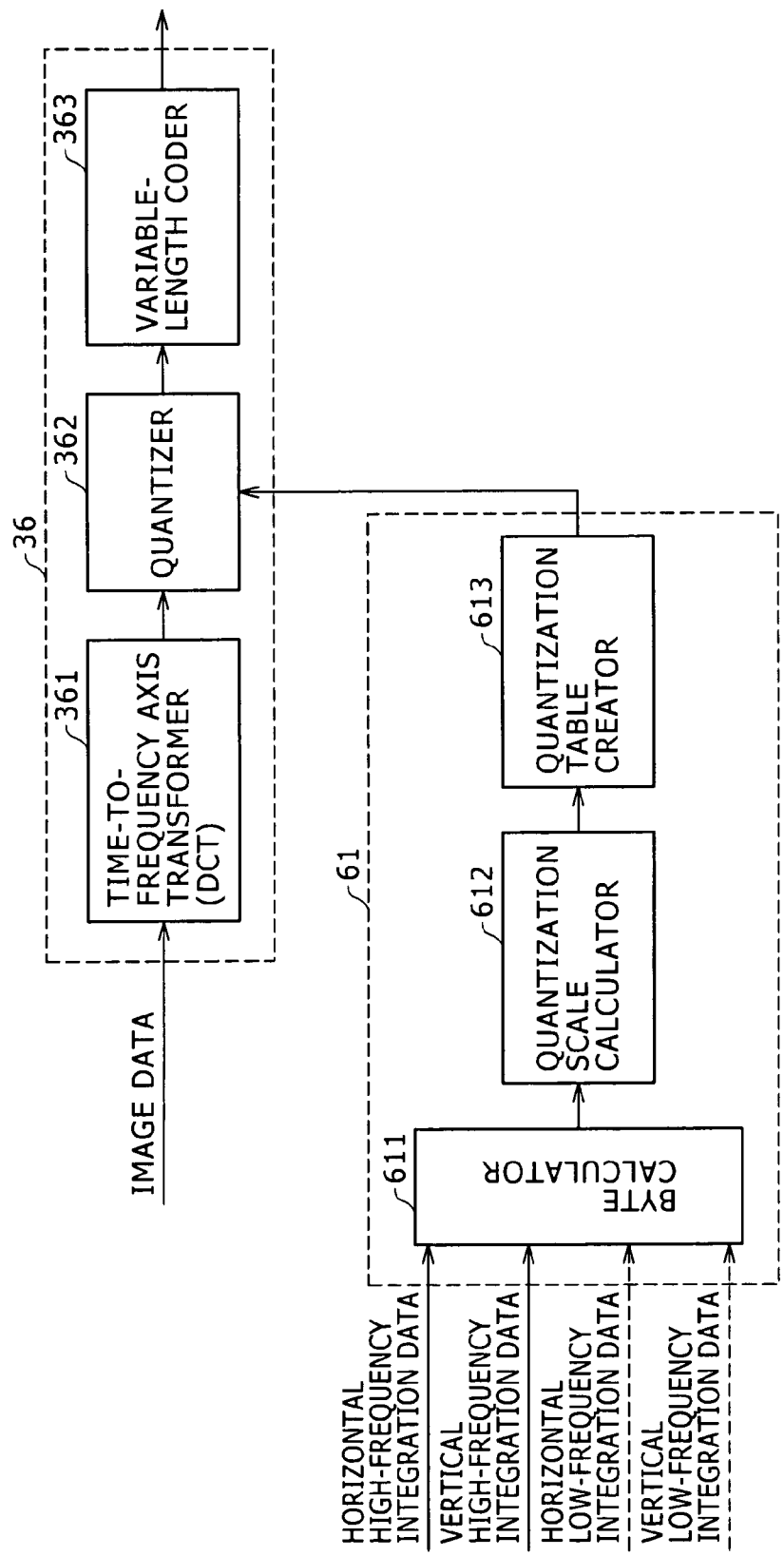

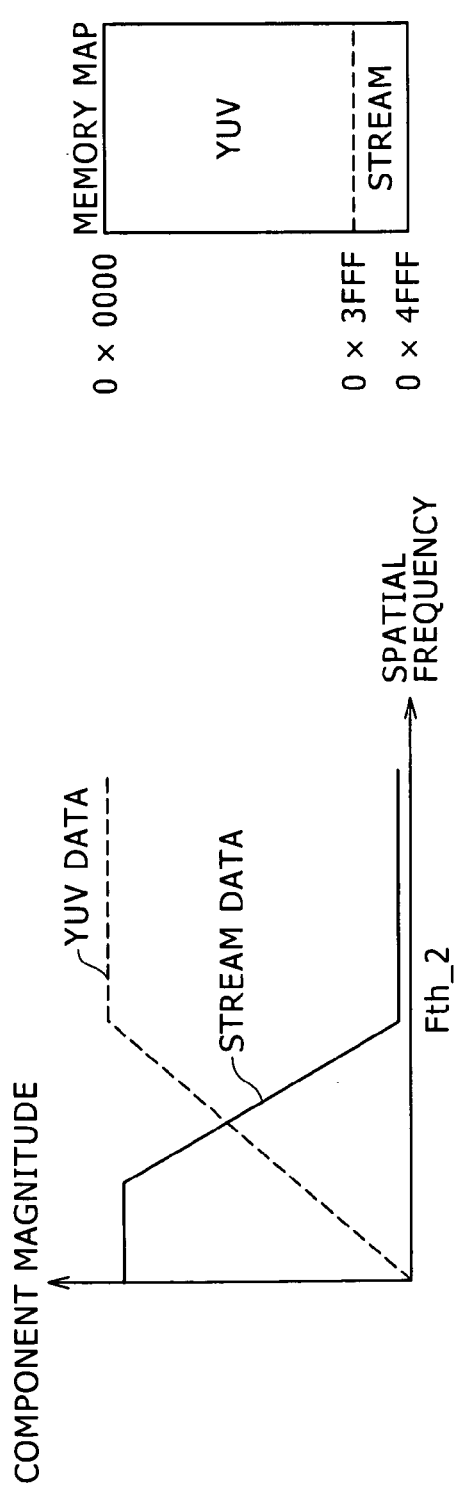

FIG. 6

QUANTIZATION TABLE

HORIZONTAL DIRECTION →

VERTICAL DIRECTION ↓

| 17 | 18 | 26 | 46 | 72 | 99 | 99 | 99 |
|----|----|----|----|----|----|----|----|
| 18 | 25 | 47 | 68 | 99 | 99 | 99 | 99 |
| 24 | 48 | 67 | 99 | 99 | 99 | 99 | 99 |
| 49 | 66 | 26 | 99 | 99 | 99 | 99 | 99 |
| 50 | 99 | 26 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

FIG. 9 (RELETED ART)

(RELETED ART)

IMAGE COMPRESSION PROCESSING DEVICE, IMAGE COMPRESSION PROCESSING METHOD, AND IMAGE COMPRESSION PROCESSING PROGRAM

TECHNICAL FIELD

The present invention relates to an image compression processing device, an image compression processing method and an image compression processing program that are used in processing of still image data and moving image data in various apparatuses such as digital still cameras, digital video cameras, and camera-equipped cell phone terminals.

BACKGROUND ART

Digital video cameras for mainly capturing moving images and digital still cameras for mainly capturing still images are widely used. Some of these cameras can capture both moving images and still images. Furthermore, so-called camera-equipped cell phone terminals, camera-equipped portable electronic notebooks and so on provided with a digital camera function are also becoming widely used.

In these apparatuses having an imaging function, such as the digital cameras and camera-equipped cell phone terminals, if moving image data and still image data obtained through imaging are recorded as they are in a recording medium (storage medium) of which recording capacity is finite, the recording capacity of the recording medium is fully occupied soon since the data amount of these obtained image data is large.

Therefore, when image data arising from imaging is recorded in a storage medium, the image data is subjected to data compression processing based on any of various systems so that the data amount thereof is reduced, followed by being recorded in the storage medium. For example, when image data to be recorded is moving image data, a data compression system such as the MPEG (Moving Picture Experts Group) system is used. When image data to be recorded is still image data, a data compression system such as the JPEG (Joint Photographic Experts Group) system is used.

A description will be made on one example of an existing image compression device. FIG. 9 shows one example of an existing image compression processing device that subjects still image data to data compression by the JPEG system for example. In this existing image compression processing device shown in FIG. 9, compression-target image data supplied to this device is provided to a DCT (Discrete Cosine Transform) unit 101 and is subjected to the discrete cosine transform therein to thereby be transformed from components along the time axis into components along the frequency axis. The image data transformed into the frequency-axis components is supplied to a quantizer 102.

The quantizer 102 adjusts the compression rate of the image data from the DCT unit 101 based on quantization table information obtained from a fixed-length quantization table creator 107, and supplies the adjusted image data to a variable-length coder 103. The variable-length coder 103 executes variable-length coding for the image data from the quantizer 102 by use of variable-length codes such as the Huffman codes. The variable-length coder 103 outputs the coded data as compressed image data and supplies it to a byte calculator 104.

The byte calculator 104 calculates the number of bytes of the compressed image data corresponding to one screen based on the coded image data from the variable-length coder 103, and supplies the calculation result to a quantization scale calculator 105. The quantization scale calculator 105 calculates the difference between the number of bytes calculated by the byte calculator 105 and a predetermined number of bytes to thereby calculate a compression rate adjustment amount, i.e., quantization scales. The calculation result by the quantization scale calculator 105 is supplied to the fixed-length quantization table creator 106.

The fixed-length quantization table creator 106 creates a new quantization table based on the newly calculated quantization scales as the calculation result from the quantization scale calculator 105 and a quantization table 107 supplied from a quantization table unit 107, and supplies the new quantization table to the quantizer 102. The above-described loop processing is repeated multiple times so that the image data is stepwise compressed into data having a predetermined data size.

However, because compression processing is executed multiple times (retry of compression processing is repeated) until an adequate compression rate is obtained as described above, it takes a long period to complete the compression processing. Therefore, an imaging device employing an image compression processing device like that described with FIG. 9 involves a problem that a short imaging interval cannot be used because of the long period for completion of compression processing for captured image data to be recorded. Furthermore, repeating compression processing multiple times needs provision of a high-capacity memory for holding the entire data of an original image.

In contrast, if compression into a predetermined data size through only one time of compression processing is intended, a high compression rate needs to be used. However, although a data size can be easily decreased to smaller than a predetermined size, an unnecessarily high compression rate possibly causes so-called block noise and mosquito noise, which leads to deterioration of the quality of a reproduced image.

As a solution to these problems, a technique to allow rapid and appropriate data compression through one time of data compression processing is disclosed in Japanese Patent Laid-open No. 2003-199019. In this technique, high-frequency components of an image to be recorded are extracted based on a thumbnail image of the image to be recorded, and the image data amount corresponding to one screen is predicted based on the extracted components, so that an adequate compression rate is set based on the prediction result.

DISCLOSURE OF INVENTION

According to the above-described technique disclosed in Japanese Patent Laid-open No. 2003-199019, image data can be compressed more rapidly than by the existing image compression processing described with FIG. 9. Furthermore, a compression rate obtained in advance is not unnecessarily high, which can avoid image deterioration.

However, in the technique disclosed in Japanese Patent Laid-open No. 2003-199019, in order to comprehend the characteristic of an image to be compressed, a high-frequency component integrating means extracts high-frequency components of the horizontal and vertical directions by use of a thumbnail image (preparatory image) of which size is greatly smaller than that of the original image. Therefore, there would be a case where an error is involved in the code amount prediction because of deficiency in the image information.

Furthermore, if the code amount corresponding to the entire screen is predicted only from horizontal high-frequency components like in the technique disclosed in Japanese Patent Laid-open No. 2003-199019, the following problem would arise. Specifically, when an input image G having a lateral streak pattern like one shown in FIG. 10 is processed for example, although vertical high-frequency components are large in this input image G, this characteristic is difficult to extract and the after-compression code amount is predicted to be smaller than the actual value because the code amount is predicted with a focus only on the band of the horizontal direction.

If extraction of vertical high-frequency components is also intended in order to avoid this problem, it is necessary to construct a high-frequency component extraction circuit with use of a memory (line memory) for storing therein data of a compression-target image corresponding to one line or several lines, which possibly leads to an increase in the circuit scale and cost up.

Furthermore, in the technique disclosed in Japanese Patent Laid-open No. 2003-199019, high-frequency component integration processing and code amount prediction processing are executed in an image monitoring mode for confirming whether or not an imaging target is being captured. In contrast, the captured image itself is loaded after transition to a data recording mode. Therefore, the image subjected to the high-frequency component integration processing and code amount prediction processing in the image monitoring mode does not correspond with the image loaded to be recorded. In imaging with use of a flash in particular, this point would cause deterioration of accuracy of the code amount prediction.

Accordingly, image compression processing devices having a function to compress images conventionally involve the following problems (1) to (7). Specifically, the existing devices involve the problems of (1) a long compression processing period due to multiple times of feedback processing of code amount prediction for an image to be compressed, (2) a large memory scale due to the necessity for the entire original image data to be stored in order to implement multiple times of feedback processing of code amount prediction for an image to be compressed, and (3) image quality deterioration due to insufficiency of accuracy of code amount prediction when a compression-target image is compressed through only one time of compression processing.

In addition, the existing devices further involve the problems of (4) the occurrence of a code amount prediction error due to extraction of high-frequency components from an image, such as a thumbnail (preparatory image), of which size is greatly smaller than the original image, (5) the occurrence of a prediction error in the case of an image involving imbalance of the frequency band between the horizontal and vertical directions when a code amount is predicted only from either one of horizontal and vertical high-frequency components, (6) a large memory scale due to the necessity for data corresponding to one line or several lines to be stored in order to extract vertical high-frequency components, and (7) the occurrence of a code amount prediction error due to disagreement between the compression-target image to be recorded and the image used for code amount prediction.

In consideration of the above-described problems, an object of the present invention is to provide an image compression processing device, an image compression processing method and an image compression processing program that each can clear up the above-described problems and each have the following features. Specifically, the device, method and program can execute compression processing (compression coding) for images rapidly with high accuracy, and can record yet-to-be compressed image data in a storage medium rapidly. In addition, the device, method and program allow efficient use of a storage medium in which yet-to-be compressed image data are recorded, and can improve the response of image compression processing.

In order to solve the above-described problems, an image compression processing device according to the invention set forth in claim 1 includes:

recording control means that is supplied with an image signal and records the image signal in a storage medium;

first detection means that is supplied with the image signal and detects characteristics of a horizontal high-frequency component and a vertical high-frequency component of the image signal;

calculation means that calculates a compression rate in compression coding of the image signal by a predetermined coding system based on a detection result from the first detection means; and coding means that executes compression coding for the image signal or an image signal read out from the storage medium based on the compression rate calculated by the calculation means.

According to the image compression processing device of the invention set forth in claim 1, the first detection means detects characteristics of horizontal and vertical high-frequency components of the image formed by an image signal to be processed. Based on the detection result, the calculation means calculates the compression rate of the image signal. Furthermore, in accordance with the compression rate from the calculation means, the compression coding means can compression-code the image signal into image data having a desired data amount through only one time of compression coding processing.

Due to this configuration, the compression coding processing can be executed rapidly, and whether the image is one involving drastic changes or one involving small changes can be determined by use of the horizontal and vertical high-frequency components. Thus, the compression rate can be calculated accurately without an error. Accordingly, also when a compression-coded image is subjected to expansion processing so as to be restored, the occurrence of image deterioration is avoided. In addition, because the image compression processing can be completed through one time of image coding processing, if yet-to-be compression-coded image data is stored and held in the storage medium for example, the storage medium can be utilized efficiently.

An image compression processing device according to the invention set forth in claim 2 is dependent upon the image compression processing device set forth in claim 1, and further includes second detection means that is supplied with the image signal and detects characteristics of a horizontal low-frequency component and a vertical low-frequency component of the image signal. Furthermore, the calculation means calculates a compression rate in compression coding of the image signal by a predetermined coding system based on the detection result from the first detection means and a detection result from the second detection means.

According to the image compression processing device of the invention set forth in claim 2, the second detection means detects characteristics of horizontal and vertical low-frequency components of the image formed by the image signal. The calculation means calculates the compression rate of the image signal also in consideration of the detection result by the second detection means in addition to the detection result by the first detection means. Furthermore, in accordance with the compression rate from the calculation means, the compression coding means can compression-code the image signal into image data having a desired compression rate through one time of compression coding processing.

Due to this configuration, the compression rate of the image signal can be calculated with higher accuracy also in consideration of the horizontal low-frequency component and vertical high-frequency component as the detection result by the second detection means, in addition to the horizontal and vertical high-frequency components as the detection result by the first detection means.

An image compression processing device according to the invention set forth in claim 3 is dependent upon the image compression processing device set forth in claim 2, and further includes:

determination means that determines whether or not to adjust the information amount of the image signal to be stored in the storage medium based on the detection result from the first detection means and the detection result from the second detection means; and information amount adjustment means that is provided upstream of the recording control means and adjusts the information amount of the image signal to be supplied to the recording control means if the determination means has determined that the information amount is to be adjusted.

According to the image compression processing device of the invention set forth in claim 3, the determination means determines whether or not to adjust the information amount (data amount) of an image signal to be processed, based on horizontal and vertical high-frequency components of the image formed by the image signal to be processed, detected by the first detection means, and horizontal and vertical low-frequency components of the image formed by the image signal to be processed, detected by the second detection means.

Specifically, if the determination means has determined that the image includes more low-frequency components than high-frequency components and hence involves small changes, the determination means determines that the information amount of the image signal forming the image is to be adjusted. In this adjustment, the data amount is adjusted toward a reduced amount. If it has been determined that the information amount of the image signal is to be adjusted, the information amount adjustment means provided upstream of the recording control means adjusts the information amount of the image signal to be processed, followed by recording of the resultant image signal in the storage medium via the recording control means.

This configuration offers effective use of the storage capacity of the storage medium in which yet-to-be compression-coded image signals are also recorded, and thus allows a larger amount of yet-to-be compression-coded image signals to be recorded in the storage medium rapidly. That is, image signals themselves yet to be compression-coded can be stored in the storage medium efficiently, which allows effective use of the storage medium. Furthermore, when the image signal of which information amount has been adjusted is retrieved from the storage medium, the original image signal yet to be adjusted is restored from the retrieved after-adjustment image signal. Thus, this restored image signal can be utilized in a usual manner, such as being compression-coded and recorded in another recording medium.

BRIEF DESCRIPTION OF DRAWINGS

FIG. 3 is a block diagram for explaining a low-frequency integrating circuit in the digital camera shown in FIG. 1.

FIG. 4 is a block diagram for explaining a code amount predictor realized by a CPU shown in FIG. 1 and an image compressor provided in an image codec.

FIGS. 5A to 5D are diagrams for explaining the relationship between YUV data that is image data to be recorded in a storage medium of a recording device and stream data formed through compression coding.

FIG. 6 is a diagram showing one example of a quantization table.

BEST MODE FOR CARRYING OUT THE INVENTION

One embodiment of a device, method and program according to the present invention will be described in detail below with reference to the drawings. In the following, explanations will be made mainly on examples in which a device, method and program according to the invention are applied to a digital camera (imaging device) that captures static images (still images).

[Configuration of Digital Camera]

Figure 1:
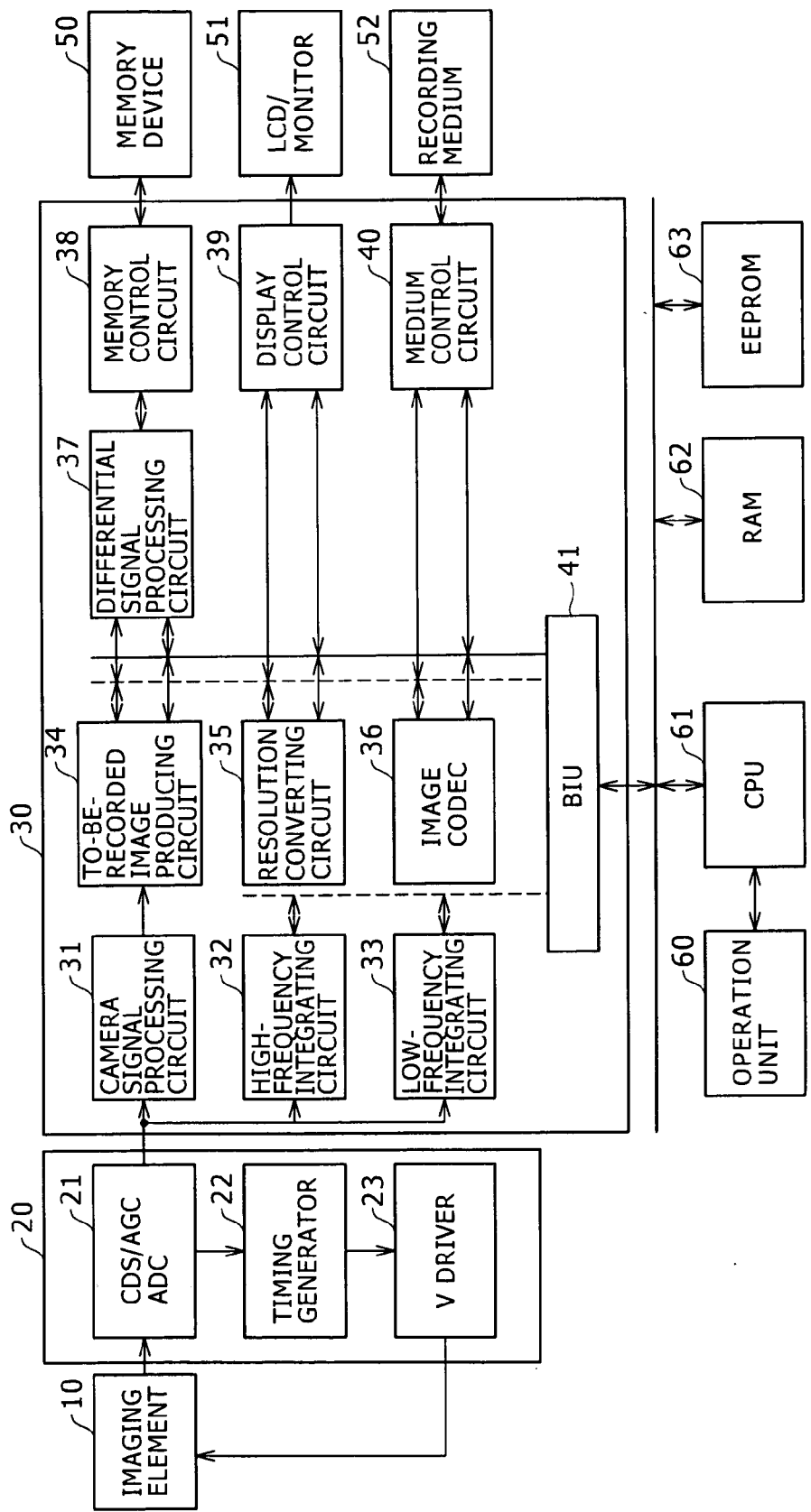
FIG. 1 is a block diagram for explaining a digital camera to which one embodiment of the invention is applied.

FIG. 1 is a block diagram for explaining the configuration of a digital camera of this embodiment. As shown in FIG. 1, the digital camera of this embodiment includes, in rough classification, an imaging element 10, a pre-processing circuit 20, and a camera DSP (Digital Signal Processor) 30. Furthermore, the digital camera includes a memory device 50 that is an externally coupled apparatus, an LCD/monitor 51, a recording medium 52, a CPU (Central Processing Unit) 61 that functions as a controller, a RAM (Random Access Memory) 62, an EEPROM (Electrically Erasable and Programmable Read Only Memory) 63, and an operation unit 60 that accepts an instruction input from a user.

Referring to FIG. 1, the imaging element 10 is a component for capturing image information, such as a CCD (Charge Coupled Device) or CMOS (Complementary Metal-Oxide Semiconductor).

The pre-processing circuit 20 includes a CDS (Correlated Double Sampling)/AGC (Automatic Gain Control)/ADC (Analog/Digital Converter) circuit 21, a timing generator 22, and a V driver 23. Image information that has been captured through the imaging element 10 and converted into an electric signal is supplied to the CDS/AGC/ADC circuit 21 in the pre-processing circuit 20.

The CDS/AGC/ADC circuit 21 executes CDS processing for the supplied image information to keep a favorable S/N ratio thereof, and executes AGC processing to control the gain thereof. Furthermore, the CDS/AGC/ADC circuit 21 executes A/D conversion to thereby form image data converted into a digital signal. The above-described processes are carried out by the CDS/AGC/ADC circuit 21. The timing generator 22 and the V driver 23 control the drive timing of the imaging element 10 based on information from the CDS/AGC/ADC circuit 21. The image data from the pre-processing circuit 20 is supplied to the camera DSP 30.

As shown in FIG. 1, the camera DSP 30 includes a camera signal processing circuit 31, a high-frequency integrating circuit 32, a low-frequency integrating circuit 33, a to-be-recorded image producing circuit 34, a resolution converting circuit 35, an image codec 36, a differential signal processing circuit 37, a memory control circuit 38, a display control circuit 39, a medium control circuit 40, and a BIU (Bus Interface Unit) 41.

Furthermore, the memory device 50, the LCD (Liquid Crystal Display)/monitor 51, and the recording medium 52 are connected to the camera DSP 30 as shown in FIG. 1. The memory device 50 is a semiconductor memory that has a comparatively large storage capacity, and is e.g. an SDRAM (Synchronous Dynamic Random Access memory). The recording medium 52 is e.g. a so-called memory card employing a semiconductor memory. It should be obvious that it is also possible to use as the recording medium 52 any of optical recording media such as recordable DVDs and recordable CDs, magnetic disks and other various media.

The memory control circuit 38 controls writing of image data to the memory device 50 and reading-out of image data from the memory device 50. The display control circuit 39 controls displaying of an image on the LCD (Liquid Crystal Display)/monitor 51. The medium control circuit 40 controls writing of image data to the recording medium 52 and reading-out of image data from the recording medium 52.

The BIU 41 is a block serving as an interface between the CPU 61 and the camera DSP 30. Based on a signal from the operation unit 60 as a user interface, the CPU 61 loads a program from the EEPROM 63 and executes the program by use of the RAM 62 serving as a work memory, to thereby assure operation in accordance with a request from a user with communicating with the camera DSP 30.

The imaging operation by the digital camera of this embodiment is carried out as follows. In response to an imaging operation instruction from a user accepted through the operation unit 60, the CPU 61 controls the imaging element 10 and the pre-processing circuit 20 so that the image of a target object is captured as image data and the captured image data is supplied to the camera signal processing circuit 31, the high-frequency integrating circuit 32 and the low-frequency integrating circuit 33 in the camera DSP 30.

The camera signal processing circuit 31 subjects the supplied image data to camera signal processing such as AF (Auto Focus), AE (Auto Exposure) and AWB (Auto White Balance), and supplies the processed image data to the to-be-recorded image producing circuit 34. The to-be-recorded image producing circuit 34 produces YUV data that is image data to be recorded from the supplied image data that has been subjected to the camera signal processing, and supplies the produced data to the differential signal processing circuit 37. In the present specification, the "YUV data" as image data means image data composed of a Y signal (luminance signal), a Cb signal (blue color difference signal), and a Cr signal (red color difference signal).

The differential signal processing circuit 37, for which a detailed description will be made later, implements differential compression for image data (YUV data) to be recorded, to thereby suppress the data amount of images recorded in the memory device 50 so that recording of a larger amount of image data therein is allowed. The image data processed by the differential signal processing circuit 37 is recorded in a memory of the memory device 50 through the memory control circuit 38.

Thereafter, in accordance with control by the CPU 61, the memory control circuit 38 retrieves the newly recorded image data from the memory device 50, and supplies the retrieved data to the resolution converting circuit 35 through a system bus. The resolution converting circuit 35 executes processing of changing the size of the image to be displayed based on the supplied image data depending on the display screen of the LCD/monitor 51, and supplies the image data of which size has been changed to the display control circuit 39.

The display control circuit 39 creates an image signal (video signal) to be supplied to the LCD/monitor 51 based on the image data from the resolution converting circuit 35, and supplies the created signal to the LCD/monitor 51. Accordingly, the image corresponding to the image data captured through the imaging element 10 is displayed on the display screen of the LCD/monitor 51, which allows a user to view the image.

Furthermore, if e.g. a shutter button provided in the operation unit 60 is pushed down, the image data retrieved from the memory device 50 is supplied also to the image codec 36. The image codec 36 compresses the supplied image data into stream data by a predetermined compression system such as the JPEG system or MPEG system. Specifically, the image codec 36 executes time-to-frequency axis transform processing by the DCT or the like, quantization processing, and variable-length coding processing to thereby compress the image data.

The image data compressed by the image codec 36 is recorded in the memory device 50 via the differential signal processing circuit 37 and the memory control circuit 38, or the image data compressed by the image codec 36 is recorded in the recording medium 52 via the medium control circuit 40.

In addition, if the CPU 61 is instructed to reproduce the image data recorded in the recording medium 52 through the operation unit 60, the CPU 61 controls the medium control circuit 40 so that the target image data is retrieved from the recording medium 52 and is supplied to the image codec 36. When compression-coded image data is supplied to the image codec 36, the image codec 36 subjects the data to decoding processing to thereby restore the before-coding original image data, and supplies the decoded data to the LCD/monitor 51 via the resolution converting circuit 35 and the display control circuit 39 so that the image corresponding to the image data recorded in the recording medium 52 is reproduced.

In the above-described manner, this digital camera captures the image of a target object as image data into the memory device 50, and displays the image corresponding to the captured image data on the display screen of the LCD/monitor 51 so that the image can be viewed. Furthermore, if a shutter button in the operation unit 60 is pushed down, the digital camera executes data compression for the image data captured into the memory device 50 by use of a compression system such as the JPEG or MPEG, and allows the compressed data to be recorded in the memory device 50 and the recording medium 52. In addition, the digital camera retrieves the compressed image data recorded in the recording medium 52 and decodes it, so that the image corresponding to the decoded image data can be displayed on the display screen of the LCD/monitor 51.

Moreover, the digital camera of this embodiment employs the high-frequency integrating circuit 32 and the low-frequency integrating circuit 33 to thereby enable the image codec 36 to properly complete image data compression processing (coding processing) through one time of processing. Furthermore, in the digital camera, the differential signal processing circuit 37 executes differential signal processing, which allows more efficient data compression for yet-to-be compression-coded image data (YUV data) to be recorded in the memory device 50. Thus, the image data can be recorded in the memory device 50 rapidly and the memory device 50 itself can be utilized efficiently.

[Configuration and Operation of High-Frequency Component Integrating Circuit 32]

The high-frequency component integrating circuit 32 shown in FIG. 1 will be described in detail below. As shown in FIG. 1, in the digital camera of this embodiment, the high-frequency component integrating circuit 32 provided in the camera DSP 30 accurately predicts the code amount of data compressed by a predetermined compression system such as the JPEG system or MPEG system. Furthermore, the high-frequency component integrating circuit 32 detects the characteristics of the horizontal and vertical directions of an image to be recorded in order to allow the differential signal processing circuit 37 to execute differential signal processing efficiently.

Figure 2:
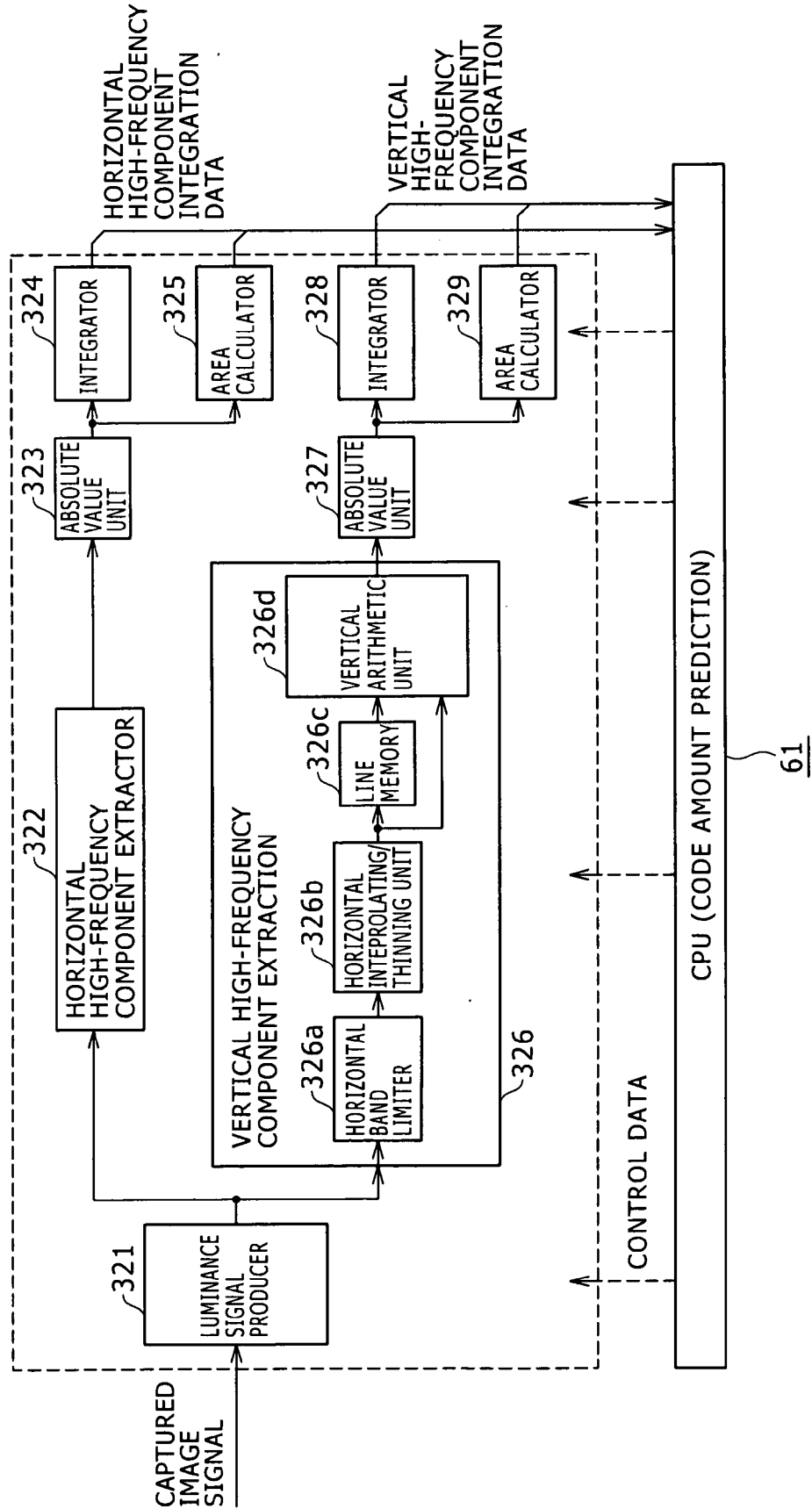
FIG. 2 is a block diagram for explaining a high-frequency integrating circuit in the digital camera shown in FIG. 1.

FIG. 2 is a block diagram for explaining the high-frequency component integrating circuit 32 used in the digital camera of this embodiment. As shown in FIG. 2, the high-frequency component integrating circuit 32 includes a luminance signal producer 321 and two processing systems for the horizontal and vertical directions, respectively, of a processing-target image.

The processing system for the horizontal direction includes a horizontal high-frequency component extractor 322, an absolute value unit 323, an integrator 324, and an area calculator 325. The processing system for the vertical direction includes a vertical high-frequency component extractor 326, an absolute value unit 327, an integrator 328, and an area calculator 329.

The vertical high-frequency component extractor 326 includes a horizontal band limiter 326a, a horizontal interpolating/thinning unit 326b, a line memory 326c, and a vertical arithmetic unit 326d as shown in FIG. 2, to thereby allow the data amount of each line to be reduced to some extent so that sufficient processing is permitted even if the storage capacity of the line memory is not large, as described later in detail.

Image data (captured image signal) from the pre-processing circuit 20 is supplied to the luminance signal producer 321. The luminance signal producer 321 produces a luminance signal from the supplied image data. The luminance signal producer 321 may extract from the supplied image data, only pixel data that widely covers the frequency band of the image (e.g. green pixel data, in the case of a primary-color imager (image)), so that the extracted pixel data is used as a pseudo luminance signal. The luminance signal produced by the luminance signal producer 321 is supplied to the horizontal high-frequency component extractor 322 and the vertical high-frequency component extractor 326.

If green pixel data (green color signal) is used as a pseudo luminance signal, processing in the high-frequency component integrating circuit 32 can be carried out accurately without a deficiency in data because the data amount has been already reduced.

Because image data is input in the order of horizontal scanning in general, the horizontal high-frequency component extractor 322 can be formed of a high-pass filter having a comparatively simple configuration. In contrast, the vertical high-frequency component extractor 326 should form a high-pass filter for an image signal between two or plural points having therebetween the time difference corresponding to just one line. Therefore, in this embodiment, the line memory 326c having a capacity equivalent to image data (captured image signal) corresponding to one line is provided for one line, or the plural line memories 326c are provided for several lines.

However, provision of a line memory with a large storage capacity leads to increases in the circuit scale and power consumption. To address this problem, the vertical high-frequency component extractor 326 in this embodiment thins one-line image data to data of the necessary minimum number of pixels for the high-frequency component extractor 326, followed by storing of the resultant data in the line memory 326c. For this purpose, the high-frequency component extractor 326 includes the horizontal band limiter 326a and the horizontal interpolating/thinning unit 326b also as described above.

Specifically, in the vertical high-frequency component extractor 326, initially the horizontal band limiter 326a limits a luminance signal (image signal) from the luminance signal producer 321 to only predetermined low-frequency components, to thereby prevent so-called fold-back due to horizontal thinning processing. That is, the data amount of the luminance signal is limited to a predetermined amount.

Subsequently, the horizontal interpolating/thinning unit 326b executes interpolation filter processing with use of multi-tap pixels in the horizontal direction, and executes thinning processing for the luminance signal so that the number of pixels of the resultant signal becomes a number covered by the capacity of the line memory 326c. The luminance signal that has been thus subjected to pixel thinning is written to the line memory 326c. As described above, in this embodiment, the vertical high-frequency component extractor 326 forms, with the minimum hardware, a high-pass filter that obtains a luminance signal between two or plural points having therebetween the time difference corresponding to just one line and calculates the difference between the points to thereby extract high-frequency components.

The high-frequency components of the luminance signal, obtained by the horizontal and vertical high-frequency component extractors 322 and 326 in the high-frequency component integrating circuit 32 shown in FIG. 2, are supplied to the corresponding absolute value units 323 and 327, respectively.

The absolute value unit 323 converts the horizontal high-frequency components of the luminance signal from the horizontal high-frequency component extractor 322 into the absolute values, in order to prevent the high-frequency components from canceling each other in the integrator 324 at the subsequent stage. Similarly, the absolute value unit 327 converts the vertical high-frequency components of the luminance signal from the vertical high-frequency component extractor 326 into the absolute values, in order to prevent the high-frequency components from canceling each other in the integrator 328 at the subsequent stage.

Subsequently, the horizontal high-frequency components of the luminance signal, converted into the absolute values by the absolute value unit 323, are supplied to the integrator 324 and the area calculator 325. The vertical high-frequency components of the luminance signal, converted into the absolute values by the absolute value unit 327, are supplied to the integrator 328 and the area calculator 329.

The integrator 324 executes integration processing (accumulation processing) for the supplied horizontal high-frequency components of the luminance signal as the absolute values with defining e.g. one screen as the processing unit region to thereby obtain horizontal high-frequency component integration data, and supplies the data to the CPU 61 as a code amount predictor. Similarly, the integrator 328 executes integration processing (accumulation processing) for the supplied vertical high-frequency components of the luminance signal as the absolute values with defining one screen as the processing unit region to thereby obtain vertical high-frequency component integration data, and supplies the data to the CPU 61 as the code amount predictor.

It should be noted that the processing unit region of the integration processing is not limited to one screen. The processing unit region of the integration processing may be an optionally specified region. It is possible to use, as the optionally specified region, any of regions having various sizes, such as a macro block (region of 16×16 pixels), a sub block (region of 8×8 pixels), a region equivalent to plural macro blocks, and a region equivalent to plural sub blocks.

The area calculator 325 counts the number of times of the integration processing in the integrator 324 to thereby calculate the area of the region including the horizontal high-frequency components of the luminance signal subjected to the integration processing, and supplies the calculation result to the CPU 61 as the code amount predictor. Similarly, the area calculator 329 counts the number of times of the integration processing in the integrator 328 to thereby calculate the area of the region including the vertical high-frequency components of the luminance signal subjected to the integration processing, and supplies the calculation result to the CPU 61 as the code amount predictor.

In the above-described manner, the following data are supplied from the high-frequency component integrating circuit 32 to the CPU 61 as the code amount predictor: the integration data of the horizontal high-frequency components of the luminance signal (horizontal high-frequency component integration data); the data indicating the area of the region including the horizontal high-frequency components subjected to the integration; the integration data of the vertical high-frequency components of the luminance signal (vertical high-frequency component integration data); and the data indicating the area of the region including the vertical high-frequency components subjected to the integration.

The CPU 61 in the digital camera of this embodiment has also a function as a code amount predictor also as described above. Furthermore, the CPU 61 sets control data for the respective units in the high-frequency component integrating circuit 32 shown in FIG. 2.

Specifically, the CPU 61 executes the following kinds of control: control of the kind and coefficient of the filter in the luminance signal producer 321; control of high-luminance suppression processing and so on for a luminance signal; control of the kinds and coefficients of the filters in the horizontal and vertical high-frequency component extractors 322 and 326; control of the kind and coefficient of the filter in the band limiter 326a in the vertical high-frequency component extractor 326; control of the interpolation filter and thinning rate of the horizontal interpolating/thinning unit 326b; control of parameters of the absolute value units 323 and 327; and control of region specification in the integrators 324 and 328.

[Configuration and Operation of Low-Frequency Component Integrating Circuit 33]

The low-frequency component integrating circuit 33 shown in FIG. 1 will be described below. The low-frequency component integrating circuit 33 included in the digital camera of this embodiment has a configuration similar to that of the high-frequency component integrating circuit 32 described above with FIG. 2, except that the low-frequency component integrating circuit 33 treats low-frequency components of a luminance signal produced from image data.

FIG. 3 is a block diagram for explaining the low-frequency component integrating circuit 33 used in the digital camera of this embodiment. As is apparent from a comparison between the low-frequency component integrating circuit 33 shown in FIG. 3 and the high-frequency component integrating circuit 32 shown in FIG. 2, the low-frequency component integrating circuit 33 shown in FIG. 3 has a configuration similar to that of the high-frequency component integrating circuit 32 shown in FIG. 2, except that the low-frequency component integrating circuit 33 includes a horizontal low-frequency component extractor 332 and a vertical low-frequency component extractor 336 instead of the horizontal high-frequency component extractor 322 and the vertical high-frequency component extractor 326 included in the high-frequency component integrating circuit 32 shown in FIG. 2.

The vertical low-frequency component extractor 336 includes a horizontal band limiter 336a, a horizontal interpolating/thinning unit 336b, a line memory 336c, and a vertical arithmetic unit 336d, similarly to the vertical low-frequency component extractor 326 in the high-frequency component integrating circuit 32 shown in FIG. 2. Processing-target signals for the horizontal low-frequency component extractor 332 and the vertical low-frequency component extractor 336 in the low-frequency component integrating circuit 33 are low-frequency components in a predetermined band.

A luminance signal producer 331, absolute value units 333 and 337, integrators 334 and 338, and area calculators 335 and 339 in the low-frequency component integrating circuit 33 are configured and operate similarly to the corresponding units in the high-frequency component integrating circuit 32 shown in FIG. 2, i.e., similarly to the luminance signal producer 321, the absolute value units 323 and 327, the integrators 324 and 328, and the area calculators 3258 and 329, respectively.

Image data (captured image signal) from the pre-processing circuit 20 is supplied to the luminance signal producer 331 in the low-frequency component integrating circuit 33 shown in FIG. 3. The luminance signal producer 331 produces a luminance signal from the supplied image data. The luminance signal producer 331 also may extract from the supplied image data, only pixel data that widely covers the frequency band of the image (e.g. green pixel data, in the case of a primary-color imager (image)), so that the extracted pixel data is used as a pseudo luminance signal. The luminance signal produced by the luminance signal producer 331 is supplied to the horizontal low-frequency component extractor 332 and the vertical high-frequency component extractor 336.

Because image data is input in the order of horizontal scanning in general also as described above, the horizontal low-frequency component extractor 322 can be formed of a high-frequency trap filter or low-pass filter having a comparatively simple configuration. In contrast, the vertical low-frequency component extractor 336 thins one-line image data to data of the necessary minimum number of pixels for the low-frequency component extractor 336, followed by storing of the resultant data in the line memory 336c. For this purpose, the low-frequency component extractor 336 includes the horizontal band limiter 336a and the horizontal interpolating/thinning unit 336b also as described above.

In this manner, in this embodiment, the vertical low-frequency component extractor 336 forms, with the minimum hardware, a high-pass filter that obtains a luminance signal between two or plural points having therebetween the time difference corresponding to just one line and calculates the difference between the points. Furthermore, if the level of the differential signal is equal to or lower than a predetermined threshold value, the low-frequency component extractor 336 determines that the signal is a low-frequency component and integrates the differential signal, to thereby extract low-frequency components.

The low-frequency components of the luminance signal, obtained by the horizontal and vertical low-frequency component extractors 332 and 326 in the low-frequency component integrating circuit 33 shown in FIG. 3, are supplied to the corresponding absolute value units 333 and 337, respectively, followed by being converted into the absolute values therein. Subsequently, the horizontal low-frequency components of the luminance signal, converted into the absolute values by the absolute value unit 333, are supplied to the integrator 334 and the area calculator 335. The vertical low-frequency components of the luminance signal, converted into the absolute values by the absolute value unit 337, are supplied to the integrator 338 and the area calculator 339.

The integrator 334 executes integration processing for the supplied horizontal low-frequency components of the luminance signal as the absolute values with defining e.g. one screen as the processing unit region to thereby obtain horizontal low-frequency component integration data, and supplies the data to the CPU 61 as the code amount predictor. Similarly, the integrator 338 executes integration processing for the supplied vertical low-frequency components of the luminance signal as the absolute values with defining one screen as the processing unit region to thereby obtain vertical high-frequency component integration data, and supplies the data to the CPU 61 as the code amount predictor.

The processing unit region of the integration processing is not limited to one screen. Similarly to in the high-frequency component integrating circuit 32 described above with FIG. 2, it is also possible to employ any of optionally specified regions such as a macro block (region of 16×16 pixels), a sub block (region of 8×8 pixels), a region equivalent to plural macro blocks, and a region equivalent to plural sub blocks.

The area calculator 335 counts the number of times of the integration processing in the integrator 334 to thereby calculate the area of the region including the horizontal low-frequency components of the luminance signal subjected to the integration processing, and supplies the calculation result to the CPU 61 as the code amount predictor. Similarly, the area calculator 339 counts the number of times of the integration processing in the integrator 338 to thereby calculate the area of the region including the vertical low-frequency components of the luminance signal subjected to the integration processing, and supplies the calculation result to the CPU 61 as the code amount predictor.

In this manner, the following data are supplied from the low-frequency component integrating circuit 33 to the CPU 61 as the code amount predictor: the integration data of the horizontal low-frequency components of the luminance signal (horizontal low-frequency component integration data); the data indicating the area of the region including the horizontal high-frequency components subjected to the integration; the integration data of the vertical low-frequency components of the luminance signal (vertical low-frequency component integration data); and the data indicating the area of the region including the vertical low-frequency components subjected to the integration.

The CPU 61 in the digital camera of this embodiment has also a function as a code amount predictor also as described above. Furthermore, the CPU 61 sets control data for the respective units in the low-frequency component integrating circuit 33 shown in FIG. 3.

Specifically, the CPU 61 executes the following kinds of control: control of the kind and coefficient of the filter in the luminance signal producer 331; control of high-luminance suppression processing and so on for a luminance signal; control of the kinds and coefficients of the filters in the horizontal and vertical high-frequency component extractors 332 and 336; control of the kind and coefficient of the filter in the band limiter in the vertical high-frequency component extractor 336; control of the interpolation filter and thinning rate of the horizontal interpolating/thinning unit 336b; control of parameters of the absolute value units 333 and 337; and control of region specification in the integrators 334 and 338.

[Configuration and Operation of Coding Predictor and Image Compressor]

A description will be made below on the CPU 61 as the code amount predictor that is supplied with the horizontal high-frequency integration data and vertical high-frequency integration data from the high-frequency component integrating circuit 32 and the horizontal low-frequency integration data and vertical low-frequency integration data from the low-frequency component integrating circuit 33 as described above, and executes code amount prediction based on these data. Furthermore, a description will be made on the image codec 36 as an image compressor that executes image compression processing. In this embodiment, the CPU 61 realizes the function as the code amount predictor by a program executed by the CPU 61 itself.

FIG. 4 is a block diagram for explaining the function of the CPU 61 as the code amount predictor and the function of the image codec 36 as the image compressor. As shown in FIG. 4, the CPU 61 as the code amount predictor has the functions as a byte calculator 611, a quantization scale calculator 612, and a quantization table creator 613. Furthermore, the image codec 36 as the image compressor has the functions as a time-to-frequency axis transformer (DCT unit) 361, a quantizer 362, and a variable-length coder 363.

As described with FIGS. 2 and 3, the horizontal and vertical high-frequency integration data from the high-frequency integrating circuit 32 and the horizontal and vertical low-frequency integration data from the low-frequency integrating circuit 33 are supplied to the byte calculator 611 realized by the CPU 61 as the code amount predictor.

Based on the high-frequency integration data and low-frequency integration data, the byte calculator 611 calculates the number of bytes of the compressed data of an image in the following manner. Specifically, if the image to be recorded is one that involves so-called drastic changes, i.e., includes large high-frequency components and small low-frequency components, the byte calculator 611 offers a large number as the number of bytes of the compressed data of the image. In contrast, if the image is one that involves so-called small changes, i.e., includes small high-frequency components and large low-frequency components, the byte calculator 611 offers a small number as the number of bytes of the compressed data of the image. That is, the byte calculator 611 properly grasps the number of bytes of the after-compression data of a compression-target image to be recorded depending on the degree of changes in the compression-target image.

The number of bytes of the after-compression image data, calculated by the byte calculator 611, is supplied to the quantization scale calculator 612. Based on the number of bytes of the after-compression image data calculated by the byte calculator 611, the quantization scale calculator 612 calculates the quantization scales that allow the recording-target image to be compressed into a predetermined number of bytes through only one time of processing, and supplies the calculated quantization scales to the quantization table creator 613.

The quantization table creator 613 creates a quantization table based on the quantization scales from the quantization scale calculator 612, and supplies the quantization table to the quantizer 362 in the image codec 36 as the image compressor.

In this manner, based on the image data of an image to be compressed, the CPU 61 as the code amount predictor accurately calculates the number of bytes of the after-compression data dependent upon the complexity of the image to be compressed, based on the horizontal high-frequency and low-frequency components and vertical high-frequency and low-frequency components of the image.

Furthermore, based on the number of bytes of the after-compression data of the compression-target image calculated by the byte calculator 611, the quantization scale calculator 612 calculates the quantization scales for compressing the compression-target image through one time of compression processing. Subsequently, a quantization table to be used in actual quantization processing is created by the quantization table creator based on the calculated quantization scales, followed by being supplied to the quantizer 362 in the image compressor 36. This operation sequence allows the image data of the compression-target image to be compression-coded with an optimal compression rate.

Meanwhile, image data read out from the memory device 50 is supplied via a data bus to the time-to-frequency axis transformer 361 in the image codec, and is subjected to the discrete cosine transform (DCT) therein so as to be transformed from time-axis components to frequency-axis components, followed by being supplied to the quantizer 362. The quantizer 362 adjusts the compression rate of the image data based on the quantization table obtained from the quantization table creator 613. The variable-length coder 613 subjects the image data to variable-length coding by use of variable-length codes such as the Huffman codes, and outputs the coded data as final compressed image data.

Figure 9:
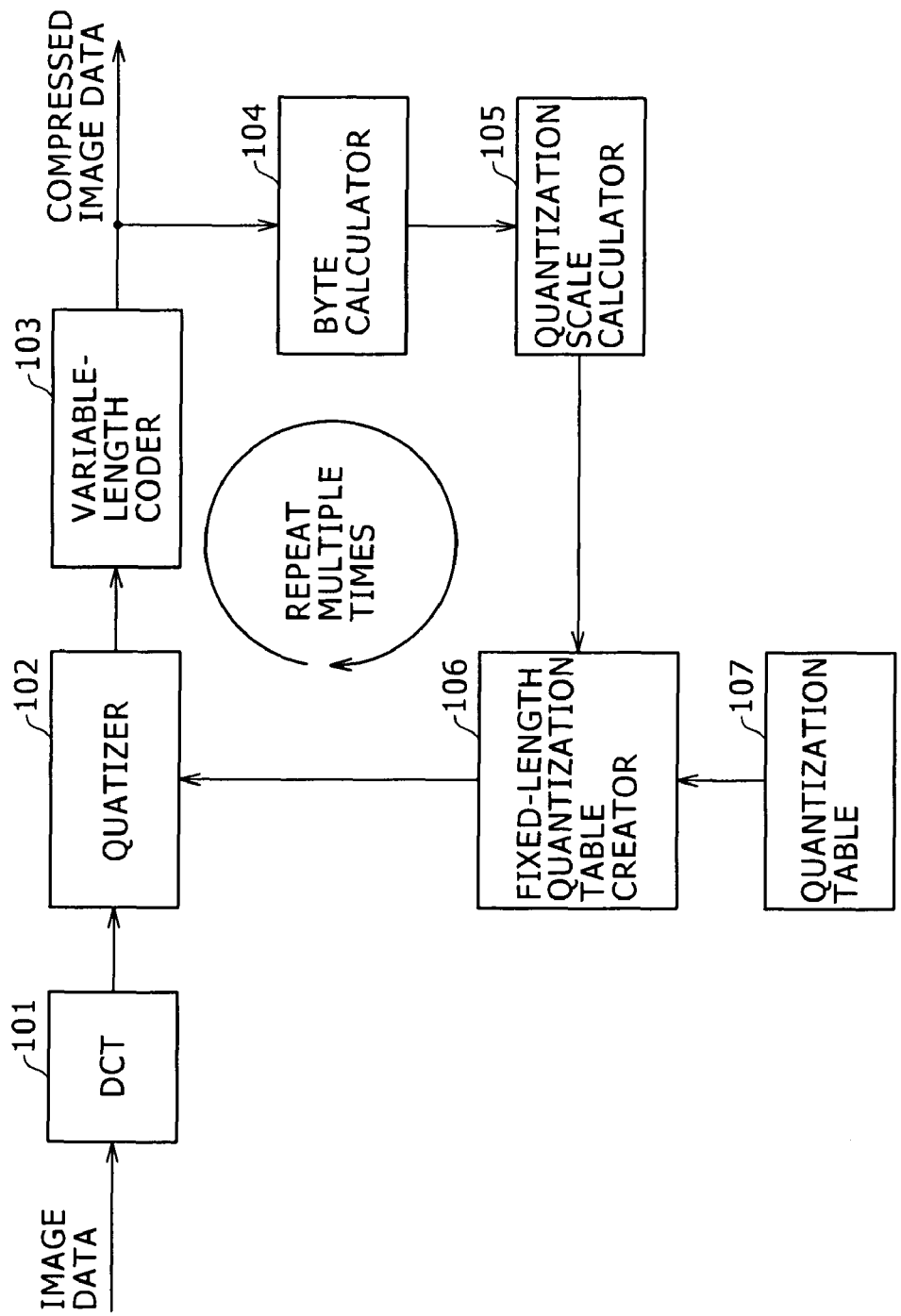
FIG. 9 is a block diagram for explaining one example of an existing image compression processing device.
Figure 10:
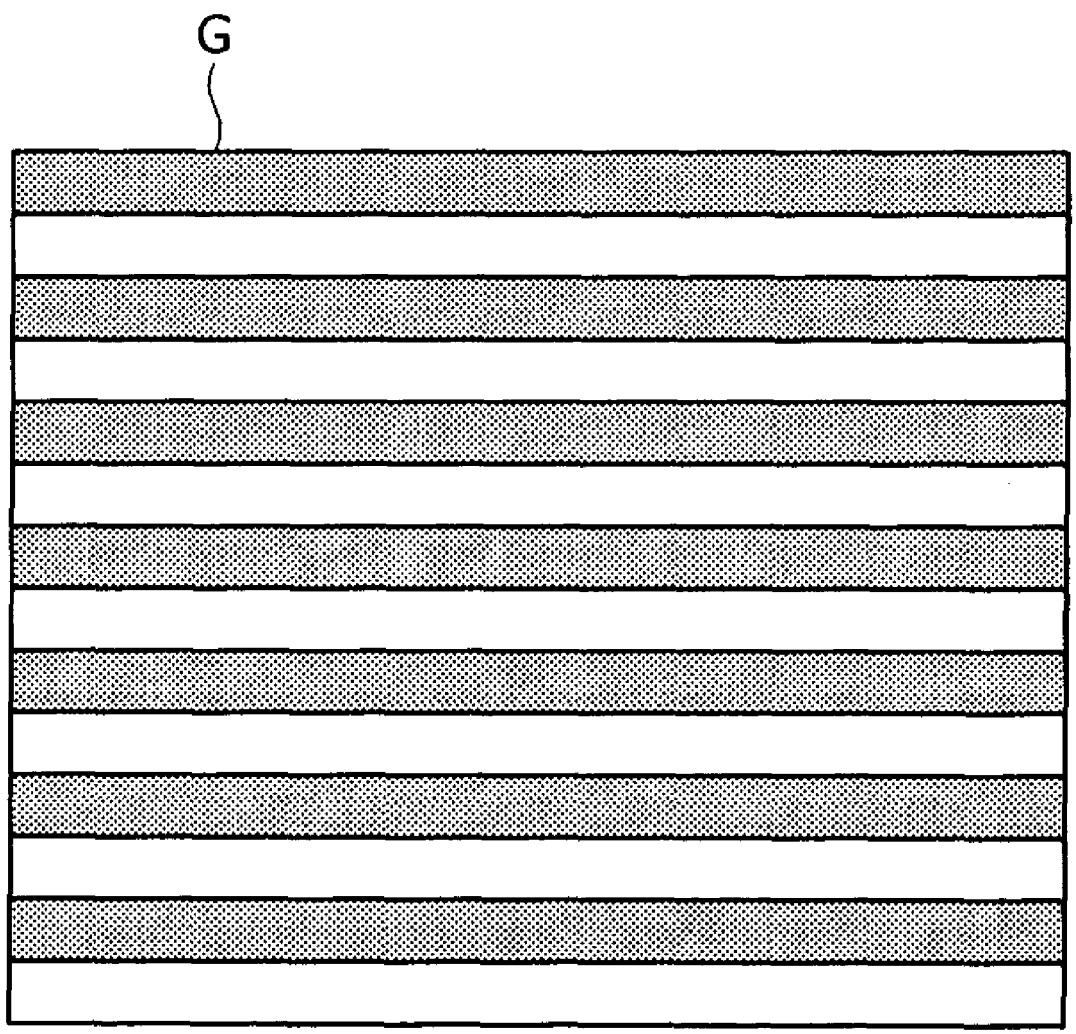
FIG. 10 is a diagram for explaining an example of an image including few horizontal high-frequency components and much vertical high-frequency components.

As described above, the digital camera of this embodiment is greatly different from the existing image compression device described with FIG. 9, in that the digital camera of the embodiment achieves a large advantage that there is no need to repeat code amount prediction multiple times with compressed image data being fed back but only one time of compression processing can offer compressed image data. That is, the digital camera of the embodiment allows rapid image data compression processing.

An actual operation mode is as follows. When a recording start button (or shutter button) in the operation unit 60 of FIG. 1 is operated by a user and thus the recording start timing is recognized (detected), the timing is supplied to the CPU 61. The CPU 61 executes timing control for the respective units so that the image data captured through the imaging element at the moment of the recording start operation (or pushing down of a shutter) is subjected to the camera signal processing and to-be-recorded image production processing while the same image is subjected to the high-frequency component integration processing. Due to this timing control, both the image on the path of the image processing and the image on the path of the high-frequency component integration and code amount prediction can be matched to the original image, which allows highly accurate code amount prediction.

In the digital camera of this embodiment, the byte calculator 611 estimates the number of bytes of the after-compression image data (after-compression code amount) based on the output information from the high-frequency integrating circuit 32 and the low-frequency integrating circuit 33. By thus comparing the output from the high-frequency integrator with that from the low-frequency integrator, the after-compression code amount can be estimated with high accuracy.

If the accuracy of the estimation of the code amount of the after-compression image data may be somewhat low, it is also possible, of course, for the byte calculator 611 to estimate the code amount of the after-compression image data by use of only the output from the high-frequency integrating circuit 32. Alternatively, the code amount of the after-compression image data may be calculated by use of not the output from the high-frequency integrating circuit 32 but only the output from the low-frequency integrating circuit 33.

[Explanation of Characteristic Part of Digital Camera]

In the digital camera of this embodiment shown in FIG. 1, the high-frequency integrating circuit 32 and the low-frequency integrating circuit 33 correspond to features of the present invention. Therefore, with a focus on this point, a description will be made below on characteristic part of the digital camera shown in FIG. 1.

In the digital camera of this embodiment shown in FIG. 1, YUV image data that has passed through the camera signal processing circuit 31 and the to-be-recorded image producer 34 and stream data arising from data compression (compression coding) of the YUV image data in the image codec 36 are stored in e.g. a storage medium of the memory device 50. The YUV data and stream data have the data amount relationship like those shown in FIGS. 5A to 5D.

The stream data shown in FIGS. 5A and 5B correspond to data resulting from data compression in the existing image compression device shown in FIG. 9 for example. The stream data shown in FIGS. 5C and 5D correspond to data resulting from data compression in the digital camera of this embodiment. Furthermore, as the YUV data shown in these drawings, data of which component magnitude is equivalent across all the spatial frequencies is employed.

FIG. 5A shows the data amount relationship between the YUV data (yet-to-be compressed data) and stream data (after-compression data) of an image in which the magnitudes of the components of all the spatial frequencies are equal to each other. In FIG. 5A, the abscissa indicates the spatial frequency while the ordinate indicates the component magnitude. Because the component magnitude is equivalent across all the spatial frequencies, the YUV data is expressed by a flat waveform as indicated by the doted line in FIG. 5A.

In contrast, as for the stream data, the magnitudes of high-frequency components thereof are small as indicated by the full line in FIG. 5A. This is because high-frequency components are compressed to a larger extent than low-frequency components by use of a compression coding system such as the JPEG system, by utilizing the facts that changes in image information among adjacent pixels in a screen are moderate in many of natural pictures, and that human's eyes are sensitive to moderate image information changes but insensitive to sharp image information changes. Therefore, in the quantization processing by the image codec, high-frequency components resulting from the DCT are compressed more intensely.

When data compression to obtain stream data like that indicated by the full line in FIG. 5A is intended, if the existing image compression device shown in FIG. 9 is used, it is needed that the values of the fixed-length quantization table 107 in the image compression device shown in FIG. 9 are set so that larger values are assigned to higher-frequency components. FIG. 6 shows an example of values in the quantization table. The value at the upper left corner corresponds to the DC component. A lower and righter value corresponds to a higher spatial frequency for both the horizontal and vertical directions.

The values of "99" in FIG. 6 correspond to the effect of compressing high-frequency components. The values in the table of FIG. 6 and the values output from the DCT unit 101 in the image compression device shown in FIG. 9 are combined with each other in the quantizer 102 in FIG. 9 for example, which offers small values as the values of the resultant stream data. Due to this operation, the value of "0 (zero)" is included in many high-frequency component data. The quantized data is compressed by the variable-length coding (e.g., run-length coding) block 103 in FIG. 9.

FIG. 5B shows the memory map on the memory device 50 in FIG. 1 for the YUV image data and stream data. The memory map of FIG. 5B results from mapping of the data amounts obtained by integrating the component magnitude in FIG. 5A with respect to the spatial frequency. FIG. 5B reveals that the stream data is smaller than the YUV data in size.

In the digital camera of the embodiment described above with FIG. 1, the operation of estimating the code amount of after-compression image data, executed by the CPU 61 based on output information from the high-frequency integrating circuit 32 and the low-frequency integrating circuit 33, is intended to determine the value of the spatial frequency Fth_1 at which the magnitude of the spatial frequency component of stream data becomes small in FIG. 5A. The reason for the frequency determination is that the size of stream data recorded in the memory device 50 is finite.

FIG. 5C is a graph for explaining the relationship between YUV data and stream data mainly regarding the data amount thereof. The YUV data shown in FIG. 5C is obtained by compressing the YUV data shown in FIG. 5A through processing in the differential signal processing circuit 37 in the digital camera of this embodiment shown in FIG. 1. The stream data shown in FIG. 5C results from data compression of the YUV data shown in FIG. 5A by a predetermined compression system such as the JPEG or MPEG. FIG. 5D is a diagram showing the state of the memory map on the memory in which the YUV data and stream data shown in FIG. 5C have been recorded.

The stream data in FIG. 5C is the same as that shown in FIG. 5A. In contrast, as for the YUV data, the component magnitude increases as the spatial frequency increases up to a special frequency Fth_2, and is kept at a constant value when the spatial frequency is higher than the frequency Fth_2. This feature will be explained below.

A condition where an image includes much low spatial frequency components means that the image can be compressed by use of differential compression such as DPCM (Differential Pulse Code Modulation). For example, in the case of monotonically increasing values such as 0, 1, 2, 3, 4, the information thereof can be transmitted with only the start value ("0", in this case) and the increase step ("1") of the monotonic increasing. If an image includes much low spatial frequency components, it is more advantageous to save the data of the image after subjecting the data to the differential compression.

In the digital camera in FIG. 1, this differential compression is executed by the differential signal processing circuit 37. Specifically, in writing of YUV data to the memory device 50, the differential signal processing circuit 37 executes the differential compression for an image including more low-frequency components than high-frequency components. On the other hand, when YUV data recorded in the memory device 50 after the differential compression is to be utilized, the differential signal processing circuit 37 executes differential expansion for the retrieved YUV data.

In FIG. 5C, the component magnitude of the YUV data is kept constant when the spatial frequency is the frequency Fth_2 or higher. This is because execution of the differential compression for components of spatial frequencies equal to or higher than the frequency Fth_2 results in an increased data amount adversely, and therefore it is more advantageous to produce the data thereof without executing the differential compression.

For example, if differential compression is executed for data of which component magnitude toggles between 0 and 8 like 0, 8, 0, 8, 0, the resultant data is composed of the start value ("0", in this case), the increase step (+8), and the decrease step (−8). This differential compression is equivalent to conversion from the original data train 0, 8, 0, 8, 0 to a data train 0, +8, −8, +8, −8. Accordingly, due to the bits for the signs, the data amount is increased as a result of the differential compression.

Therefore, in the digital camera of this embodiment, the differential compression is executed only when the data of a captured image includes more low-frequency components than high-frequency components. Whether or not to execute the differential compression may be determined on entire screen basis. Alternatively, it is also possible to, for each section of the screen, compare the magnitude of low-frequency components with that of high-frequency components and determine which way is employed for the recording in the memory.

If the data of a captured image includes both data subjected and not subjected to the differential compression, identifiers for differentiating both the data are necessary. The identifiers may be stored in the setting register from the CPU 61 provided in the differential signal processing circuit 37 in FIG. 1 for use. Alternatively, the identifier may be added to YUV data of each predetermined unit so as to be recorded in the memory device 50 or the like together with the YUV data.

In conclusion, any system is available as long as, when YUV data recorded in the memory device 50 is retrieved for use, it can be determined accurately whether or not the retrieved YUV data has been subjected to the differential compression and execution of differential expansion for only the YUV data subjected to the differential compression is assured.

As is apparent from a comparison between the memory map shown in FIG. 5B, obtained when YUV data is recorded in the memory device 50 without being subjected to differential signal processing, and the memory map shown in FIG. 5D, obtained when YUV data including more low-frequency components than high-frequency components is recorded in the memory device 50 after being subjected to differential signal processing, using the differential signal processing can compress the YUV data itself and hence allows e.g. the entire one-screen YUV data to be stored and held with a smaller storage capacity.

Although the data amount of YUV data including much low-frequency components can be reduced efficiently through differential signal processing, when the YUV data including much low-frequency components is coding-compressed by a coding compression system such as the JPEG, the compression rate is somewhat low, which results in stream data with a large data amount.

In contrast, as for YUV data including much high-frequency components, differential signal processing is not executed because the data amount cannot be reduced efficiently. However, when YUV data including much high-frequency components is coding-compressed by a coding compression system such as the JPEG, the compression rate is high, which can offer stream data with a small data amount as shown in FIGS. 5A and 5B.

Therefore, if YUV data as yet-to-be compression-coded image data and stream data as compression-coded image data are recorded in the same storage medium such as the memory device 50 like in the digital camera of this embodiment, the data amounts of the YUV data and stream data change depending on the frequency characteristic of the images as indicated by the doted line in FIG. 5D. Thus, the storage medium that records both YUV data and stream data can be utilized adaptively and efficiently.

The unit of the differential signal processing may be one screen. However, in order to improve the effect, it is desirable to define a smaller unit region and execute the differential signal processing for each unit region. The following configuration is available for example. Specifically, one screen is divided into a predetermined number of unit regions such as 8 regions or 16 regions. For each of the unit regions, horizontal and vertical high-frequency components and low-frequency components are detected, so that whether or not to execute differential signal processing is determined depending on the detection result. It is also possible, of course, to implement the detection and determination for each macro block or each sub block.

The differential signal processing may be executed so that original data (raw data not subjected to differential processing) is transferred only as the first data and differential data are transferred as all the subsequent data. However, in order to eliminate influence of errors, it is desirable to transfer original data of a somewhat higher ratio to differential data, such as to alternately transfer original and differential data, or to transfer one original data every time two differential data are transferred.

As described above, in the digital camera of this embodiment, based on the characteristic of horizontal and vertical high-frequency components (state of high-frequency components) of a compression-target image obtained by the high-frequency integrating circuit 32 and the characteristic of horizontal and vertical low-frequency components (state of low-frequency components) of the compression-target image obtained by the low-frequency integrating circuit 33, the compression rate of data compression by a predetermined compression coding system such as the JPEG or MPEG is accurately predicted, which allows compression coding to be properly carried out through one time of compression coding processing.

Furthermore, the differential signal processing circuit 37 is controlled based on outputs from the high-frequency integrating circuit 32 and the low-frequency integrating circuit 33 so that YUV data itself to be recorded in the memory device 50 is subjected to differential compression, which can achieve efficient use of the memory device 50.

[Data Writing/Reading to/from Memory Device 50]

Figure 7:
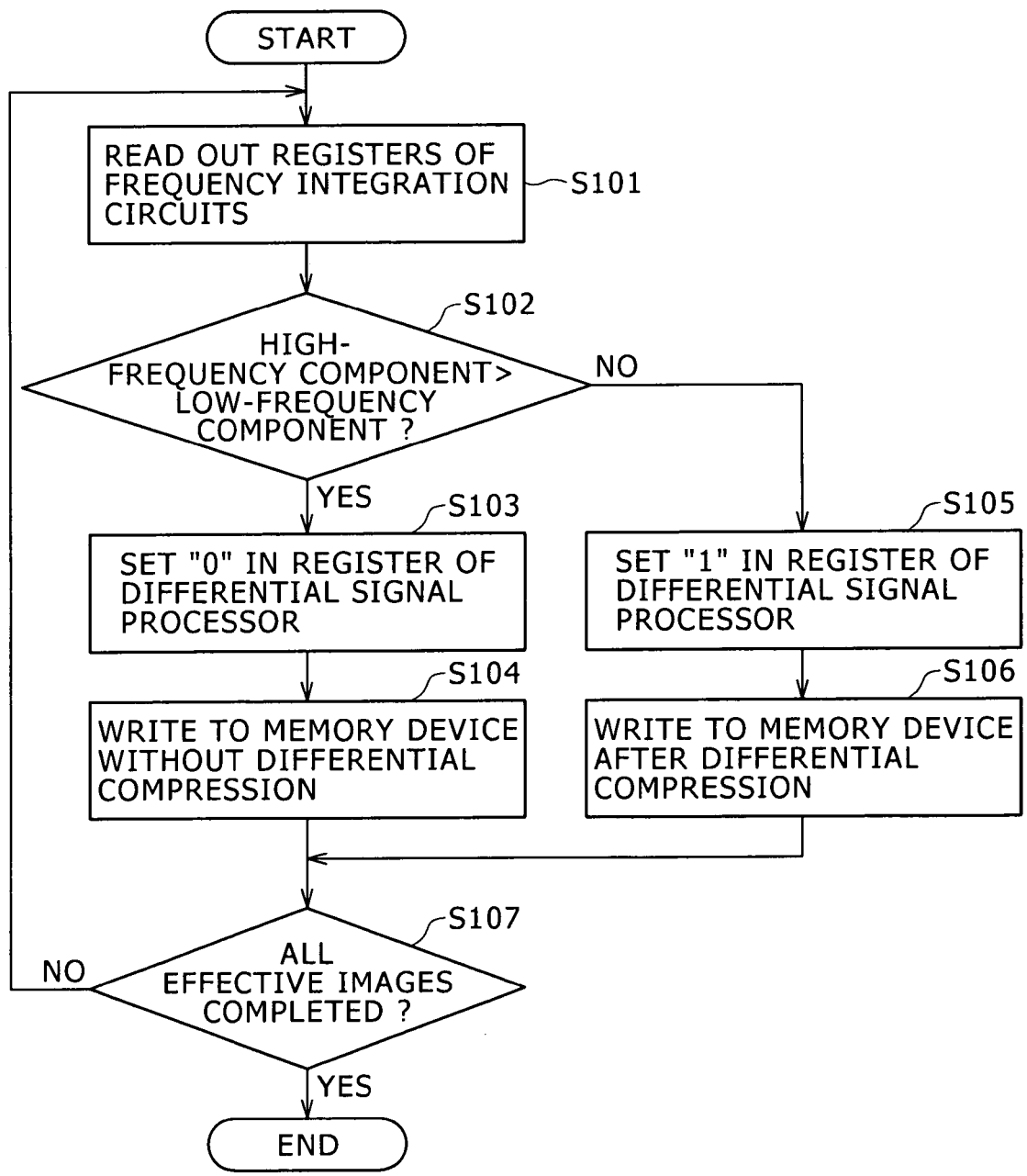
FIG. 7 is a flowchart for explaining processing of data writing to a memory device (storage medium) 50.
Figure 8:
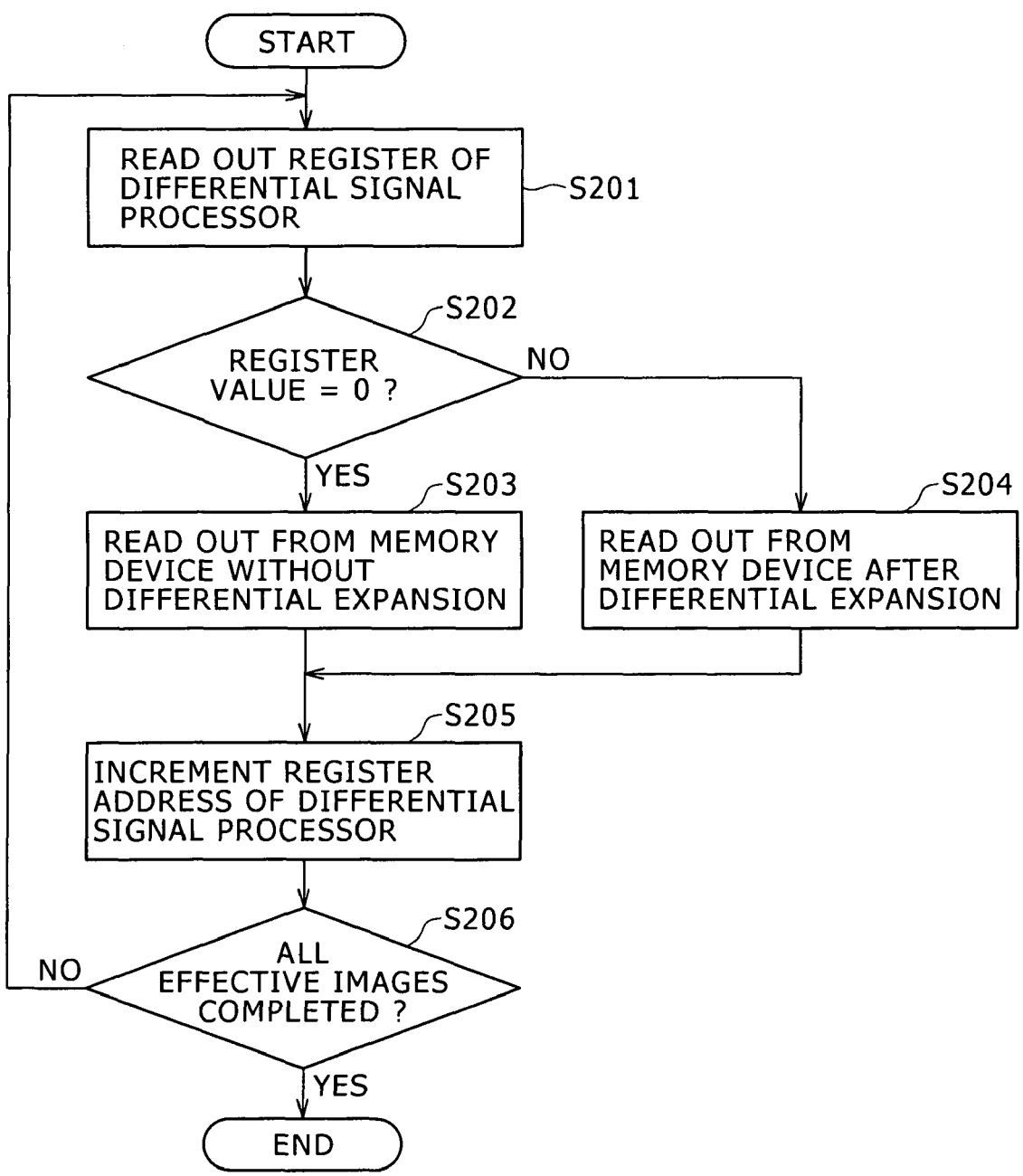
FIG. 8 is a flowchart for explaining processing of data reading from the memory device (storage medium) 50.

Descriptions will be made below on processing of data writing to the memory device 50 and processing of data reading from the memory device 50 executed in the digital camera of this embodiment shown in FIG. 1 with reference to the flowcharts shown in FIGS. 7 and 8. FIG. 7 is a flowchart for explaining the processing of data writing to the memory device 50. FIG. 8 is a flowchart for explaining the processing of data reading from the memory device 50.

The processing of data writing to the memory device 50 will be described below with reference to the flowchart of FIG. 7. Upon being instructed to write data to the memory device 50 through e.g. an instruction input from a user, the CPU 61 starts the processing shown in the flowchart of FIG. 7.

Initially, the CPU 61 reads out the registers of the high-frequency integrating circuit 32 and the low-frequency integrating circuit 33 in FIG. 1 via the BIU (Bus Interface Unit) for each part of an image (step S101). Subsequently, for a supplied image signal, the CPU 61 determines whether or not high-frequency components of the image are more dominant than low-frequency components thereof (step S102). If it has been determined in the determination processing of the step S102 that high-frequency components are more dominant than low-frequency components, the CPU 61 sets "0" in the register of the differential signal unit (step S103), and writes YUV data (image data) to the relevant region in the memory device 50 without executing differential compression therefor (step S104).

If it has been determined in the determination processing of the step S102 that low-frequency components are more dominant than high-frequency components, the CPU 61 sets "1" in the register of the differential signal unit (step S105), and writes YUV data (image data) to the relevant region in the memory device 50 after executing differential compression therefor (step S106).

Upon completion of the data writing processing in the step S104 or the writing processing in the step S106, whether or not retrieval of all effective images has been completed is determined (step S107). If it has been determined that the retrieval has not been completed, the processing from the step S101 is repeated. If it has been determined that the retrieval has been completed, the processing shown in FIG. 7 is ended.

The processing of data reading from the memory device 50 will be described below with reference to the flowchart of FIG. 8. The processing shown in FIG. 8 may be executed by the CPU 61 shown in FIG. 1, or alternatively may be executed inside the differential signal processing circuit 37. In the following, an example in which the processing is executed inside the differential signal processing circuit 37 will be described.

Upon receiving a data reading control signal due to control by the CPU 61, the differential signal processing circuit 37 starts the processing shown in FIG. 8. Initially, the differential signal processing circuit 7 reads out the value of a flag, which is its own register, indicating whether or not differential compression has been executed in data writing regarding YUV data to be read out from the memory device 50 (step S201). Subsequently, it is determined whether or not the value is "0", which indicates that the data has not been subjected to the differential compression (step S202).

If it has been determined in the determination processing of the step S202 that the value read out from the register is "0", the YUV data to be retrieved is data in the region corresponding to the non-execution of the differential compression. Therefore, the data is read out from the memory device 50 without being subjected to differential expansion processing (step S203). In contrast, if it has been determined in the determination processing of the step S202 that the value read out from the register is not "0", the YUV data to be retrieved is data in the region corresponding to the execution of the differential compression. Therefore, the data is read out from the memory device 50 with being subjected to differential expansion processing (step S204).

After the processing of the step S203 or the step S204, the register address of the differential signal processing circuit 37 is incremented (step S205), followed by determination as to whether or not retrieval of all effective images has been completed (step S206). If it has been determined in the determination processing of the step S206 that the retrieval of all effective images has not been completed, the processing is repeated from the S201. If it has been determined that the retrieval has been completed, the processing shown in FIG. 8 is ended.

Thus, also for YUV data, which is yet-to-be compression-coded image data to be recorded in the memory device 50, the data amount thereof can be adjusted efficiently depending on the frequency characteristic of the image formed by the YUV data. Furthermore, even if data is recorded in the memory device 50 after the data amount thereof is adjusted, the data can be properly restored when being retrieved, and used.

In the above-described embodiment, the memory control circuit 38 realizes the function as the recording control means, the high-frequency integrating circuit 32 realizes the function as the first detection means, and the low-frequency integrating circuit 33 realizes the function as the second detection means. Furthermore, a function of the CPU 61 as the code amount predictor realizes the function as the calculation means that calculates a compression rate, and the image codec 36 realizes the function as the coding means.

In addition, the function as the information amount adjustment means that adjusts the information amount of an image signal is realized by the differential signal processing circuit 37. The function as the determination means that determines whether or not to adjust an information amount is realized by the CPU 61 that receives a detection output from the high-frequency integrating circuit 32 and a detection output from the low-frequency integrating circuit 33.

It is also possible that e.g. the CPU 61 or a program (software) executed by the CPU 61 and the camera DSP realizes the functions of the following units shown in FIG. 1: the high-frequency integrating circuit 32, the low-frequency integrating circuit 33, the image codec 36, the differential signal processing circuit 37, the code amount predictor 61, and so on.

Although an example in which still image data is processed has been explained in the above description of the embodiment, the present invention is not limited to the example. Processing of moving image data also can apply the invention, almost similarly to the above-described still image data processing. That is, the invention can be applied also to a moving image recording function. Specifically, if code amount prediction is executed by use of high-frequency component integration data of a to-be-recorded moving image in parallel to signal processing for the moving image, after-compression code amount or bit rate of the moving image can be controlled efficiently.

Although an example in which the invention is applied to a digital camera that mainly captures still images has been explained in the above description of the embodiment, the present invention is not limited to the example. The invention can be applied to the overall case of executing compression processing for still image data and moving image data in any of the following various apparatuses: apparatuses that can capture moving images such as so-called digital video cameras, cell phone terminals equipped with a camera function, PDAs equipped with a camera function, and information processing devices equipped with a camera function; DVD recording and reproducing apparatuses; CD recording and reproducing apparatuses; recording and reproducing apparatuses employing a hard disk as a recording medium; VTRs (Video Tape Recorders); personal computers; and other apparatuses.

INDUSTRIAL APPLICABILITY

The invention can avoid execution of multiple times of code amount prediction processing and image compression processing for a compression-target image, and hence can realize shortening of the period for the image compression processing. In addition, each of the code amount prediction processing and image compression processing for the compression-target image can be completed through one time of processing, which can eliminate the need to provide a memory for storing therein the entire data of a one-screen original image to be compressed. Therefore, an image compression processing device can be formed without increases in the circuit scale and costs.

Furthermore, although compression processing is not repeated multiple times for the same image, the accuracy of code amount prediction can be improved and therefore compression processing for an image can be executed with a more proper compression rate because the code amount of the image is predicted by use of high-frequency components of the image. Accordingly, image quality deterioration due to the image compression can be reduced.

In addition, in processing of extracting high-frequency components of a compression-target image in order to predict the code amount of the compression-target image, a thumbnail (preparatory image) of the compression-target image or the like is not used but high-frequency components are extracted from the compression-target image itself, followed by the code amount prediction based on the extracted components. Therefore, enhanced accuracy of the code amount prediction can be achieved.

Moreover, because code amount prediction is executed by using both horizontal and vertical high-frequency components, the accuracy of the code amount prediction can be improved for an image involving imbalance of the frequency band between the horizontal and vertical directions. That is, for compression-target images having various characteristics, the code amount prediction can be executed properly and hence the compression rate can be defined accurately.

Furthermore, because horizontal pixel thinning processing is also employed, even an extremely small capacity is enough as the capacity of a memory for one line or several lines necessary to extract vertical high-frequency components of an image to be compressed. This feature can prevent an increase in the circuit scale and can reduce power consumption.

In addition, by implementing timing control so that an image to be compressed is matched to the image used for code amount prediction, the accuracy of the code amount prediction for the image to be compressed can be enhanced.

When the invention is applied to a camera (imaging device), the distribution state of spatial frequencies included in an image to be compressed is determined, and the sizes of the image data (YUV data) subjected to camera signal processing and the after-compression data are decided, to thereby reduce the data amount of the data to be written to the memory. Thus, reduction in the memory capacity and power consumption can be realized. This feature allows the imaging device to realize shortening of the imaging operation interval and hence repeatedly capture images with short time intervals.

Furthermore, when the invention is applied to a camera (imaging device), if an image to be compressed includes much low-frequency components, image data (YUV data) subjected to camera signal processing is written to the memory device after being subjected to differential compression. If the image does not include much low-frequency components, the data is written to the memory device without being subjected to the differential compression. Such control can optimize the memory capacity.

In addition, a determination is made by use of frequency integrating circuits as to which of high-frequency components and low-frequency components are more dominant as the characteristic of an image to be compressed. This feature can offer various advantages, such as one that the characteristic of the image can be determined properly and hence image compression processing can be executed accurately and surely, and one that the memory capacity can be optimized.

The invention claimed is:

1. An image compression processing device comprising:
   recording control means that is supplied with an image signal and records the image signal in a storage medium;

first detection means that is supplied with the image signal and detects characteristics of a horizontal high-frequency component and a vertical high-frequency component of the image signal;

second detection means that is supplied with the image signal and detects characteristics of a horizontal low-frequency component and a vertical low-frequency component of the image signal;

calculation means that calculates a compression rate in compression coding of the image signal by a predetermined coding system based on a detection result from the first detection means and a detection result from the second detection means; and coding means that executes compression coding for the image signal or an image signal read out from the storage medium based on the compression rate calculated by the calculation means.

2. The image compression processing device according to claim 1, further comprising:

determination means that determines whether or not to adjust an information amount of the image signal to be stored in the storage medium based on the detection result from the first detection means and the detection result from the second detection means; and information amount adjustment means that is provided upstream of the recording control means and adjusts the information amount of the image signal to be supplied to the recording control means if the determination means has determined that the information amount is to be adjusted.

3. An image compression processing device comprising:

recording control means that is supplied with an image signal and records the image signal in a storage medium;

first detection means that is supplied with the image signal and detects characteristics of a horizontal high-frequency component and a vertical high-frequency component of the image signal;

second detection means that is supplied with the image signal and detects characteristics of a horizontal low-frequency component and a vertical low-frequency component of the image signal;

determination means that determines whether or not to adjust an information amount of the image signal to be stored in the storage medium based on a detection result from the first detection means and a detection result from the second detection means; and information amount adjustment means that is provided upstream of the recording control means and adjusts the information amount of the image signal to be supplied to the recording control means if the determination means has determined that the information amount is to be adjusted.

4. An image compression processing method comprising:

implementing control so that an image signal is recorded in a storage medium;

a first detection step for detecting characteristics of a horizontal high-frequency component and a vertical high-frequency component of the image signal;

a second detection step for detecting characteristics of a horizontal low-frequency component and a vertical low-frequency component of the image signal calculating a compression rate in compression coding of the image signal by a predetermined coding system based on a detection result in the first detection step and a detection result in the second detection step; and executing compression coding for the image signal or an image signal read out from the storage medium based on the compression rate calculated in the calculation step.

5. The image compression processing method according to claim 4, wherein calculating the compression rate includes:

calculating the number of bytes of after-compression data of the image signal based on the detection result in the first detection step or based on the detection result in the first detection step and the detection result in the second detection step;

calculating a quantization scale for compressing the image signal to a predetermined number of bytes through one time of compression coding processing based on the calculated number of bytes of the after-compression data;

creating a quantization table to be used for compression of the record image based on the calculated quantization scale; and indicating the compression rate of the image signal by the created quantization table.

6. The image compression processing method according to claim 4, wherein the first detection step for detecting characteristics includes:

producing from the image signal a luminance signal or a pseudo luminance signal that includes a low-frequency component and a high-frequency component dependent upon the image signal and has a frequency characteristic equivalent to a frequency characteristic of the luminance signal;

detecting the characteristic of the horizontal high-frequency component of the image signal from the luminance signal or the pseudo luminance signal; and detecting the characteristic of the vertical high-frequency component of the image signal from the luminance signal or the pseudo luminance signal.

7. The image compression processing method according to claim 6, wherein detecting the characteristic of the horizontal high-frequency component includes:

extracting the horizontal high-frequency component from the luminance signal or the pseudo luminance signal;

converting the extracted horizontal high-frequency component into an absolute value; and detecting the characteristic of the horizontal high-frequency component based on the horizontal high-frequency component converted into the absolute value, and the detecting step of the characteristic of the vertical high-frequency component includes the steps of:

limiting a frequency band in order to adjust an information amount of the luminance signal or the pseudo luminance signal;

executing horizontal thinning or interpolation of a pixel for the luminance signal or the pseudo luminance signal for which band limitation has been implemented;

storing in a line memory the luminance signal or the pseudo luminance signal that has been subjected to the thinning or interpolation and corresponds to one horizontal line;

executing arithmetic operation between the luminance signal or the pseudo luminance signal that has been subjected to the thinning or interpolation and corresponds to one horizontal line and the luminance signal or the pseudo luminance signal delayed by one horizontal line from the line memory, to extract the vertical high-frequency component;

converting the extracted horizontal high-frequency component into an absolute value; and detecting the characteristic of the vertical high-frequency component based on the vertical high-frequency component converted into the absolute value.

8. The image compression processing method according to claim 4, wherein detecting characteristics of a horizontal low-frequency component and a vertical low-frequency component of the image signal to be recorded in the storage medium includes:

producing from the image signal a luminance signal or a pseudo luminance signal that includes a low-frequency component and a high-frequency component dependent upon the image signal and has a frequency characteristic equivalent to a frequency characteristic of the luminance signal;

detecting the characteristic of the horizontal low-frequency component of the image signal from the luminance signal or the pseudo luminance signal; and detecting the characteristic of the vertical low-frequency component of the image signal from the luminance signal or the pseudo luminance signal.

9. The image compression processing method according to claim 8, wherein detecting the characteristic of the horizontal low-frequency component includes:

extracting the horizontal low-frequency component from the luminance signal or the pseudo luminance signal;

converting the extracted horizontal low-frequency component into an absolute value; and detecting the characteristic of the horizontal low-frequency component based on the horizontal low-frequency component converted into the absolute value, and detecting the characteristic of the vertical low-frequency component includes:

limiting a frequency band in order to adjust an information amount of the luminance signal or the pseudo luminance signal, executing horizontal thinning or interpolation of a pixel for the luminance signal or the pseudo luminance signal for which band limitation has been implemented, storing in a line memory the luminance signal or the pseudo luminance signal that has been subjected to the thinning or interpolation and corresponds to one horizontal line, executing arithmetic operation between the luminance signal or the pseudo luminance signal that has been subjected to the thinning or interpolation and corresponds to one horizontal line and the luminance signal or the pseudo luminance signal delayed by one horizontal line from the line memory, to extract the vertical low-frequency component, converting the extracted horizontal low-frequency component into an absolute value, and detecting the characteristic of the vertical low-frequency component based on the vertical low-frequency component converted into the absolute value.

10. The image compression processing method according to claim 4, wherein whether or not to adjust an information amount of the image signal to be stored in the storage medium is determined based on the detection result in the first detection step and the detection result in the second detection step, and if it has been determined that the information amount is to be adjusted, the information amount of the image signal to be recorded in the storage medium is adjusted.

11. The image compression processing method according to claim 10, wherein differential compression processing for the image signal is executed in adjustment of the information amount of the image signal, and it is determined, based on the characteristic of the horizontal high-frequency component, the characteristic of the vertical high-frequency component, the characteristic of the horizontal low-frequency component, and the characteristic of the vertical low-frequency component, that the information amount is to be adjusted if a low-frequency component is more dominant than a high-frequency component in the image signal.

12. The image compression processing method according to claim 10 or claim 11, wherein whether or not to adjust the information amount of the image signal is determined for each predetermined processing unit region of an image formed by the image signal.

13. An image compression processing method comprising:
recording an image signal in a storage medium;

a first detection step for detecting characteristics of a horizontal high-frequency component and a vertical high-frequency component of the image signal;

a second detection step for detecting characteristics of a horizontal low-frequency component and a vertical low-frequency component of the image signal;

determining whether or not to adjust an information amount of the image signal to be stored in the storage medium based on a detection result in the first detection step and a detection result in the second detection step; and an information amount adjustment step for adjusting the information amount of the image signal to be recorded in the storage medium if it has been determined in the determination step that the information amount of the image signal is to be adjusted.

14. The image compression processing method according to claim 13, wherein differential compression processing for the image signal is executed in the information amount adjustment step, and in determination whether or not to adjust an information amount, it is determined that the information amount is to be adjusted if a low-frequency component is more dominant than a high-frequency component in the image signal, based on the detection result in the first detection step and the detection result in the second detection step.

15. The image compression processing method according to claim 13 or claim 14, wherein in determination determining whether or not to adjust an information amount, whether or not to adjust the information amount is determined for each predetermined processing unit region of an image formed by the image signal.

16. The image compression processing method according to claim 15, wherein the method is used in an imaging device including imaging means that captures an image of a target object to form an image signal and outputs the image signal, and the image signal to be recorded in the storage medium is output from the imaging means.

17. The image compression processing method according to claim 14, wherein the method is used in an imaging device including imaging means that captures an image of a target object to form an image signal and outputs the image signal, and the image signal to be recorded in the storage medium is output from the imaging means.

18. The image compression processing method according to claim 13, wherein the method is used in an imaging device including imaging means that captures an image of a target object to form an image signal and outputs the image signal, and the image signal to be recorded in the storage medium is output from the imaging means.

19. An computer program product comprising a tangible computer readable medium including program code thereon, the program code being executable to perform operations comprising:

implementing control so that an image signal is recorded in a storage medium;

a first detection step for detecting characteristics of a horizontal high-frequency component and a vertical high-frequency component of the image signal;

a second detection step for detecting characteristics of a horizontal low-frequency component and a vertical low-frequency component of the image signal;

calculating a compression rate in compression coding of the image signal by a predetermined coding system based on a detection result in the first detection step and a detection result in the second detection step; and executing compression coding for the image signal or an image signal read out from the storage medium based on the compression rate calculated in the calculation step.

20. A computer program product comprising a tangible computer readable medium including program code thereon, the program code being executable to perform operations comprising:

recording an image signal in a storage medium;

a first detection step for detecting characteristics of a horizontal high-frequency component and a vertical high-frequency component of the image signal;

a second detection step for detecting characteristics of a horizontal low-frequency component and a vertical low-frequency component of the image signal;

determining whether or not to adjust an information amount of the image signal to be stored in the storage medium based on a detection result in the first detection step and a detection result in the second detection step; and adjusting the information amount of the image signal to be recorded in the storage medium if it has been determined in the determination step that the information amount of the image signal is to be adjusted.

21. An image compression processing device comprising:

a recording controller that is supplied with an image signal and records the image signal in a storage medium;

a first detector that is supplied with the image signal and detects characteristics of a horizontal high-frequency component and a vertical high-frequency component of the image signal;

a second detector that is supplied with the image signal and detects characteristics of a horizontal low-frequency component and a vertical low-frequency component of the image signal;

a calculator that calculates a compression rate in compression coding of the image signal by a predetermined coding system based on a detection result from the first detector and based on a detection result from the second detector; and a coder that executes compression coding for the image signal or an image signal read out from the storage medium based on the compression rate calculated by the calculator.

22. An image compression processing device comprising:

a recording controller that is supplied with an image signal and records the image signal in a storage medium;

a first detector that is supplied with the image signal and detects characteristics of a horizontal high-frequency component and a vertical high-frequency component of the image signal;

a second detector that is supplied with the image signal and detects characteristics of a horizontal low-frequency component and a vertical low-frequency component of the image signal;

a determiner that determines whether or not to adjust an information amount of the image signal to be stored in the storage medium based on a detection result from the first detector and a detection result from the second detector; and an information amount adjuster that is provided upstream of the recording controller and adjusts the information amount of the image signal to be supplied to the recording controller if the determiner has determined that the information amount is to be adjusted.

* * * * *